(12) United States Patent
Chang et al.

(10) Patent No.: US 11,568,245 B2
(45) Date of Patent: Jan. 31, 2023

(54) APPARATUS RELATED TO METRIC-LEARNING-BASED DATA CLASSIFICATION AND METHOD THEREOF

(71) Applicant: SAMSUNG ELECTRONICS CO., LTD., Suwon-si (KR)

(72) Inventors: Tae Kwon Chang, Seoul (KR); In Kwon Choi, Seongnam-si (KR); Jae Hyun Park, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 309 days.

(21) Appl. No.: 16/760,181

(22) PCT Filed: Dec. 15, 2017

(86) PCT No.: PCT/KR2017/014840
§ 371 (c)(1),
(2) Date: Apr. 29, 2020

(87) PCT Pub. No.: WO2019/098449
PCT Pub. Date: May 23, 2019

(65) Prior Publication Data
US 2020/0257975 A1    Aug. 13, 2020

(30) Foreign Application Priority Data
Nov. 16, 2017    (KR) .................... 10-2017-0152974

(51) Int. Cl.
*G10L 15/00*    (2013.01)
*G06N 3/08*    (2006.01)
(Continued)

(52) U.S. Cl.
CPC .............. *G06N 3/08* (2013.01); *G06F 40/30* (2020.01); *G06N 3/04* (2013.01)

(58) Field of Classification Search
CPC ...... G10L 15/063; G10L 15/144; G10L 15/16
See application file for complete search history.

(56) References Cited

U.S. PATENT DOCUMENTS 8,160,299 B2    4/2012    Ogawa
8,818,037 B2    8/2014    Noorkami et al.
(Continued)

FOREIGN PATENT DOCUMENTS

EP    2 639 749    9/2013
JP    5548655    7/2014
(Continued)

OTHER PUBLICATIONS

Extended Search Report dated Nov. 6, 2020 in counterpart European Patent Application No. 17932563.4.
(Continued)

*Primary Examiner* — Daniel Abebe
(74) *Attorney, Agent, or Firm* — Nixon & Vanderhye, P.C.

(57) ABSTRACT

The present invention provides artificial intelligence technology which has machine-learning-based information understanding capability, including metric learning providing improved classification performance, classification of an object considering a semantic relationship, understanding of the meaning of a scene based on the metric learning and the classification, and the like. An electronic device according to one embodiment of the present invention comprises a memory in which at least one instruction is stored, and a processor for executing the stored instruction. Here, the processor extracts feature data from training data of a first class, obtains a feature point by mapping the extracted feature data to an embedding space, and makes an artificial neural network learn in a direction for reducing a distance between the obtained feature point and an anchor point.

20 Claims, 19 Drawing Sheets

(51) Int. Cl.
*G06F 40/30* (2020.01)
*G06N 3/04* (2006.01)

(56) References Cited

U.S. PATENT DOCUMENTS

| | | | |
|---|---|---|---|
| 8,856,192 | B2 | 10/2014 | Choi et al. |
| 8,886,579 | B2 | 11/2014 | De Sousa Webber |
| 9,684,706 | B2 | 6/2017 | Satzke et al. |
| 2007/0296863 | A1 | 12/2007 | Hwang et al. |
| 2011/0231350 | A1 | 9/2011 | Momma et al. |
| 2016/0180151 | A1 | 6/2016 | Philbin et al. |
| 2017/0083770 | A1 | 3/2017 | Carlson et al. |
| 2017/0124711 | A1 | 5/2017 | Chandraker et al. |
| 2017/0228641 | A1 | 8/2017 | Sohn |
| 2018/0089566 | A1* | 3/2018 | Li .................. G06N 3/08 |
| 2018/0165546 | A1* | 6/2018 | Skans .............. G06N 3/08 |
| 2019/0130231 | A1* | 5/2019 | Liu ............... G06N 3/084 |
| 2019/0147304 | A1* | 5/2019 | Liu ............... G06N 3/084 382/157 |
| 2021/0043190 | A1* | 2/2021 | Wang ........... G10L 21/0272 |
| 2021/0125603 | A1* | 4/2021 | Liang ............. G10L 15/16 |

FOREIGN PATENT DOCUMENTS

| | | |
|---|---|---|
| JP | 2015-149078 | 8/2015 |
| KR | 10-0771244 | 10/2007 |
| KR | 10-2009-0119640 | 11/2009 |
| KR | 10-2010-0077136 | 7/2010 |
| KR | 10-2014-0138648 | 12/2014 |
| KR | 10-1595763 | 2/2016 |
| KR | 10-1646669 | 8/2016 |
| WO | 2013/133901 | 9/2013 |

OTHER PUBLICATIONS

International Search Report for PCT/KR2017/014840 dated Aug. 14, 2018, 4 pages, with English Translation.

Written Opinion of the ISA for PCT/KR2017/014840 dated Aug. 14, 2018, 13 pages, with English Translation.

Schroff et al., "FaceNet: A Unified Embedding for Face Recognition and Clustering", arXiv:1503.03832v3 [cs.CV], Jun. 17, 2015, 10 pages.

Song et al., "Deep Metric Learning via Lifted Structured Feature Embedding", arXiv:1511.06452v1 [cs.CV], Nov. 19, 2015, 11 pages.

Cui et al., "Fine-grained Categorization and Dataset Bootstrapping using Deep Metric Learning with Humans in the Loop", arXiv:1512.05227v2 [cs.CV], Apr. 11, 2016, 10 pages.

Bell et al., "Learning visual similarity for product design with convolutional neural networks", ACM Transactions on Graphics, Jul. 2015, 10 pages.

Notice of Preliminary Rejection dated Oct. 31, 2022 in counterpart Korean Patent Application No. 10-2017-0152974 and English-language translation.

* cited by examiner

APPARATUS RELATED TO METRIC-LEARNING-BASED DATA CLASSIFICATION AND METHOD THEREOF

This application is the U.S. national phase of International Application No. PCT/KR2017/014840 filed Dec. 15, 2017 which designated the U.S. and claims priority to KR Patent Application No. 10-2017-0152974 filed Nov. 16, 2017, the entire contents of each of which are hereby incorporated by reference.

Field

The present application relates to an artificial intelligence (AI) system that simulates cognition and determination functions of the human brain by utilizing a machine learning algorithm such as deep learning, or the like, and application thereof. The present application relates to an apparatus related to metric-learning-based data classification and a method thereof, and more particularly to an electronic apparatus that performs metric learning with improved performance, and data classification considering semantic based on the metric learning, and a method thereof.

Description of Related Art

An artificial Intelligence (AI) system is a computer system that implements human-level intelligence, and is a system that machines learn and determine themselves and become smart, unlike conventional rule-based smart systems. The more the AI system is used, the better the recognition rate is improved and the more accurately the system understands user's taste, such that the conventional rule-based smart systems are gradually replaced by a deep learning-based AI system.

The AI technology is composed of machine learning such as deep learning, or the like, and elementary technologies using the machine learning.

The machine learning is an algorithm technology that classifies/learns features of input data by itself. The elementary technology is a technology that simulates cognition and determination functions of hu1man brain by using machine learning algorithms such as deep learning, and is composed of technical fields such as linguistic understanding, visual understanding, reasoning/predicting, knowledge expression, motion controlling, or the like.

The AI technology applies to various fields as follows. The linguistic understanding is a technology for recognizing and applying/processing human language/characters and includes natural language processing, machine translation, dialogue system, question and answer, speech recognition/synthesis, and the like. The visual understanding is a technology of recognizing and processing an object as human vision, and includes object recognition, object tracking, image retrieval, person recognition, scene understanding, spatial understanding, image improvement, or the like. The reasoning/predicting is a technology of determining information, logically reasoning and predicting the information, and includes knowledge/probability-based reasoning, optimization prediction, preference-based planning, recommendation, or the like. The knowledge expression is a technology of automatically processing human experience information into knowledge data, and includes knowledge construction (data generation/classification), knowledge management (data utilization), or the like. The motion controlling is a technology of controlling autonomous driving of a vehicle and movement of a robot, and includes motion control (navigation, collision, driving), operation control (action control), and the like.

A metric learning, which belongs to one category of machine learning, is a software technology that learns the most suitable form of metric to be applied to a feature space into which feature vectors of the input dataset are projected or mapped. The metric is referred to as a distance function, and thus the metric learning is also referred to as a distance metric learning.

A similarity/dissimilarity may be defined for each data pair in a training data set for metric learning. The metric learning is to learn a distance function that determines distances between points of similar data as a closer distance, and determines distances between points of dissimilar data as a greater distance. The distance function may greatly affect performance of algorithms that classify input data based on distances between feature points of the input data, such as K-nearest neighbors (KNN) algorithm, or the like. Therefore, it is important to find an optimal distance function through the metric learning in order to improve classification performance.

The metric learning described above relates to an accurate classification of different data. Meanwhile, it is necessary not only to classify different data correctly, but also to understand the meanings of the data (hereinafter, referred to as semantics) in order to understand the data. In other words, the data may be understood only when both the accurate classification of the data to be analyzed and the semantics of the data are identified.

When feature data extracted from the data is clustered on the feature space, it is important that each cluster reflects semantic relationship and is disposed on the feature space in order to grasp the meaning of the data using machine learning. Otherwise, it may only be possible to determine whether the data belong to the same cluster or not, and it may be impossible to understand semantics, and further understand the situation and semantics by comprehensively identifying a plurality of data. For this operation, relative positions of a first cluster and a second cluster in the feature space may vary according to a similarity between the semantics of the data belonging to the first cluster and the semantics of the data belonging to the second cluster.

In order to provide artificial intelligence application services that require semantic understanding of input data such as scene understanding of images, emotion analysis through voice recognition, or the like, providing the improved metric learning method described above and providing the clustering method reflecting semantics are required.

Summary

A technical problem of the present application is to provide an electronic apparatus that performs metric learning with improved performance and a method thereof.

Another technical problem to be solved is to provide an electronic apparatus that performs machine learning for generating a classification model of improved performance based on an embedding space in which a result of the metric learning is reflected, or a method thereof.

Another technical problem to be solved is to provide an electronic apparatus that performs metric learning, in which semantic relationship information of each object is reflected, by using an object extracted from each frame of an image as training data, and a method thereof.

Another technical problem to be solved is to provide an electronic apparatus that identifies the semantics of each object included in the image by using an object recognition model pre-generated as a result of machine learning using an artificial intelligence algorithm, and understands a scene of the image by using the semantic relationship of each object.

The technical problems of the present application are not limited to the technical problems described above, and other technical problems that are not described will be clearly understood by those skilled in the art from the following description.

An aspect of the embodiments relates to an electronic apparatus including a memory configured to store at least one instruction, and a processor configured to execute the stored instruction, wherein the processor further configured to extract feature data from training data of a first class, obtain a feature point by mapping the extracted feature data to an embedding space, and train an artificial neural network in a direction for reducing a distance between the obtained feature point and an anchor point, and wherein the anchor point is the feature data extracted from representative data of the first class mapped to the embedding space.

The making the artificial neural network learn may include training the artificial neural network by using a loss function which defines that the closer the feature point of training data of the first class to the anchor point, the less the loss, and the closer the feature point of training data of a second class, different from the first class, to the anchor point, the greater the loss.

The making the artificial neural network learn may include training a convolutional neural network (CNN) layer for extracting the feature data of training data of the first class, and a metric learning layer for obtaining a distance between the feature point obtained by receiving data output from the CNN layer and the anchor point collectively.

The making the artificial neural network learn may include separating, from the CNN layer only the metric learning layer for obtaining a distance between the feature point obtained by receiving data output from the CNN layer for extracting the feature data of training data of the first class and the anchor point and training the separated metric learning layer.

The artificial neural network may include a metric learning layer which outputs cluster feature data formed on the embedding space, and wherein the training the artificial neural network comprises training an object classification layer composed of a single layer that receives data output from the metric learning layer and outputs a confidence level by each class.

The training the artificial neural network may include training the artificial neural network in a direction that the feature point of the training data of the first class is closer to the anchor point of the first class, and at the same time the feature point of the training data of the second class is closer to the anchor point of the second class on the embedding space, and wherein a position of the anchor point of the first class and a position of the anchor point of the second class are determined by reflecting semantic relationship information between the first class and the second class.

The semantic relationship information may include a distance in a semantic tree between a keyword of the first class and a keyword of the second class, and wherein the semantic tree reflects semantic hierarchical relationships between each keyword, and the distance in the semantic tree between the keyword of the first class and the keyword of the second class is set as the greater the number of nodes between a first node corresponding to the keyword of the first class and a second node corresponding to the keyword of the second class, the farther the distance gets.

The training the artificial neural network may include reflecting the semantic relationship information between the first class and the second class and updating a position on the embedding space of at least one of a first class cluster and a second class cluster, wherein the first class cluster is composed of the feature point of the first class and the anchor point of the first class, and wherein the second class cluster is composed of the feature point of the second class and the anchor point of the second class.

The training the artificial neural network may include updating the position of the anchor point on the embedding space by reflecting the feature point of the first class, and training the artificial neural network in a direction to reduce the distance between the feature point of the first class and the updated anchor point.

The updating the position of the anchor point on the embedding space may include not performing position update of the anchor point in an initial training composed of an iteration of first time from the training start point, but performing position update of the anchor point in an iteration after the initial training.

The performing position update of the anchor point in the iteration after the initial training may comprise performing position update of the anchor point once every two or more iterations of second time.

The first time may be set to a first value in response to a type of the training data being a first type, and is set to a second value when the type of the training data is a second type.

The electronic apparatus may include a memory configured to at least one instruction and a processor configured to execute the stored instruction, wherein the processor further configured to obtain feature points on the embedding space of each of a plurality of objects extracted from an image by using an object recognition model which outputs data related to feature points on the embedding space, and understands a scene of the image by using a keyword of an anchor point closest to at least some of the feature points, wherein the anchor point is a representative image for each class mapped onto the embedding space, and wherein the embedding space is a feature space in which a distance between the anchor points is calculated by reflecting the semantic relationship between the anchor points.

The understanding the scene of the image may include selecting a lower level anchor point closest to each of the mapped feature points, selecting at least some upper node of from among nodes of a semantic tree corresponding to each of the selected lower level anchor points, and understanding the scene of the image by using a keyword corresponding to the selected upper node.

The understanding the scene of the image may include selecting an upper level anchor point closest to at least some of the mapped feature points, and understanding the scene of the image by using a keyword corresponding to the selected the upper level anchor point.

The processor may be configured to select the object recognition model based on a type of the image.

The processor may be configured to select the object recognition model based on profile information of the electronic apparatus's user.

The processor may be configured to select the object recognition model based on an application service type.

The processor may be configured to output additional contents corresponding to the understood scene.

An aspect of the embodiments relates to a method performed by the electronic apparatus including obtaining feature points on the embedding space of each of a plurality of objects extracted from an image by using an object recognition model that outputs data related to feature on an embedding space, and understanding a scene of the image using a keyword of an anchor point closest to at least some of the feature points from among the feature points, wherein the anchor point is that a representative image for each class is mapped on the embedding space, and wherein the embedding space is a feature space in which a distance between the anchor points is calculated by reflecting a semantic relationship between the anchor points.

DETAILED DESCRIPTION

Hereinafter, certain exemplary embodiments will now be explained in detail with reference to the accompanying drawings. Advantages and features of the present disclosure and a method for achieving thereof will be apparent with reference to the embodiments described below in detail with the accompanying drawings. However, the disclosure is not limited to the embodiments disclosed below, but may be implemented in various different forms, and only the embodiments may make the disclosure of the present invention complete and are provided to fully convey the scope of the invention to those skilled in the art in the technical field where the disclosure belongs to, and the disclosure is defined only by the scope of the claims. The same reference numbers refer to the same elements throughout the specification.

If there is no other definition, all terms used in the present specification (including technical and scientific terms) may be used in a sense that can be commonly understood by those skilled in the art. In addition, terms that are defined in commonly used dictionaries are not ideally or excessively interpreted unless they are specifically and clearly defined. The terms used herein is to describe embodiments and are not intended to limit the specification. In the present specification, singular forms also include plural forms unless specifically stated in the phrase. Hereinafter, some embodiments of the specification will be described with reference to the drawings.

Figure 1:
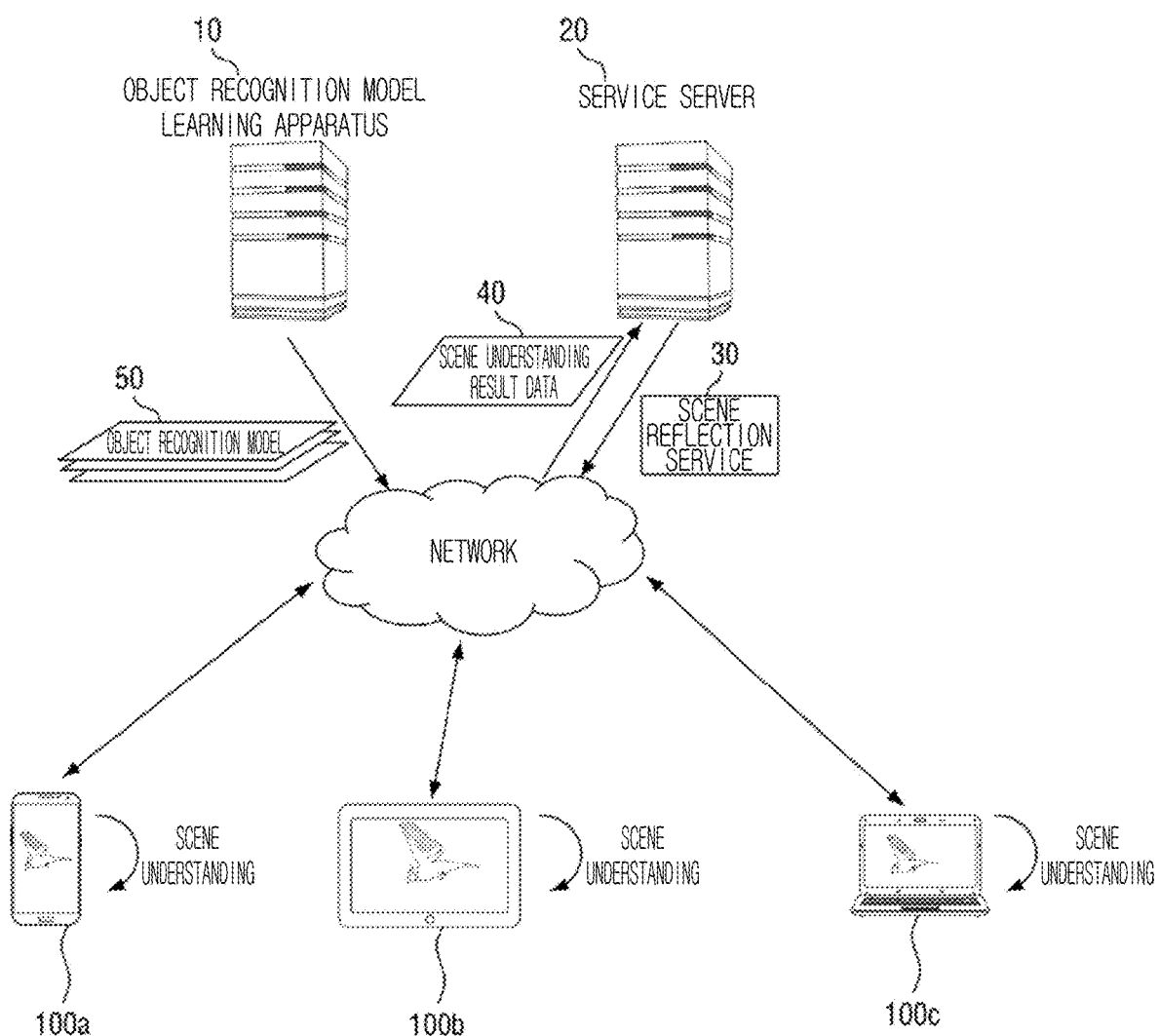
FIG. 1 is a view showing illustrating a scene understanding based service system according to an embodiment.

Configurations and operations of a scene understanding based service system according to an embodiment of the disclosure will be described with reference to FIG. 1. The system according to an embodiment may include an object recognition model learning apparatus 10 and the electronic apparatuses 100A, 100B, and 100C. The electronic apparatuses 100A, 100B, and 100C are user terminals used by a user, and may be a computing device including computing processors such as wearable devices, such as smartphones and smart watches, or the like, tablets, desktops, laptops, digital TVs, digital signage, kiosks, or the like, a digital device, or the like, including computing means.

The object recognition model learning apparatus 10 performs machine learning to generate a model for recognizing an object of an image, and provides data 50 related to the object recognition model resulted from the generation to the electronic apparatuses 100A, 100B, and 100C. The electronic apparatuses 100A, 100B, and 100C recognize one or more objects included in each frame or image of a video using the object recognition model-related data 50, and understand a scene based on the result.

Recognizing an object means determining an object region included in an image, that is, a subject expressed by a region of interest (ROI) as one of predetermined keywords. In other words, recognition of an object includes extracting an object region, inputting an image of the extracted object region into a classifier, and selecting a subject image.

Understanding a scene means determining the overall meaning or situation expressed by a current display screen using the recognition result of the objects included in the current display screen. For example, if three objects of a "cutting board", a "knife", and a "fish" are recognized on the current display screen, a result of a scene understanding of the current display screen may be a "dish". As such, semantic hierarchical relationships may need to be considered for understanding the scene. A scene understanding method according to some embodiments of the disclosure will be described later.

According to an embodiment, the electronic apparatuses 100A, 100B, and 100C may generate distance function data reflecting semantic relationship information (not illustrated) of each object by using at least some of the object recognition model related data 50, and recognize based on a position in an embedding space of a feature point of an object image. The embedding space is a space where a distance between points is calculated by the distance function.

The system according to the embodiment may further include a service server 20. The service server 20 is an electronic apparatus that provides a server/client model based online service to the electronic apparatuses 100A, 100B, and 100C. The electronic apparatuses 100A, 100B, and 100C may provide data 40 indicating a result of scene understanding, and receive a scene reflection service 30 from the service server 20.

The scene reflection service 30 may include providing additional content corresponding to a specific scene displayed on the electronic apparatuses 100A, 100B, and 100C. For example, the additional content may be a scene tailored advertisement, a search result using scene corresponding text, or a scene tailored media.

In an embodiment, the electronic apparatuses 100A, 100B, and 100C may perform incremental learning on the object recognition model, thereby improving its performance. The incremental learning may receive user feedback on the object recognition model, and re-learn the object recognition model by reflecting the feedback. The detailed description with respect to the incremental learning will be described later.

Configurations and operations of the electronic apparatus 10 according to another embodiment of the disclosure will be described with reference to FIG. 2. The electronic apparatus according to an embodiment is a device that performs machine learning to determine classification or the like, and thus requires a high level of computing performance. Therefore, the electronic apparatus according to the embodiment may be, for example, a server device such as the object recognition model learning device of FIG. 1. However, the electronic apparatus according to the embodiment is not necessarily limited to the server device. Note that a user terminal device also satisfies the above-described configuration and that performing the same operation may be the electronic apparatus according to the embodiment.

Figure 2:
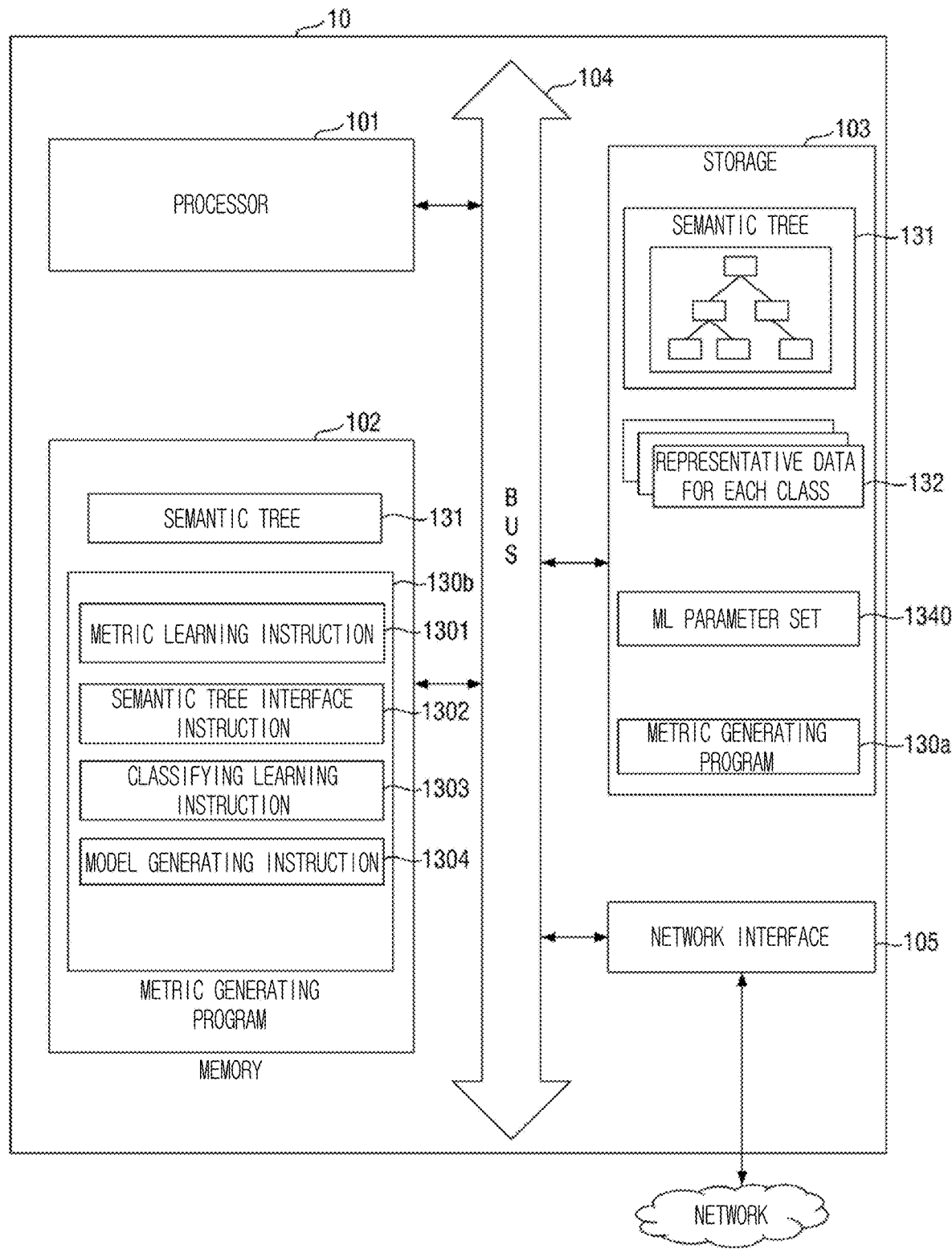
FIG. 2 is a hardware block diagram of an electronic apparatus according to an embodiment.

As illustrated in FIG. 2, the electronic apparatus 10 according to the embodiment includes a processor 101 and a memory 102 that stores a metric generating program 130B performed by the processor 101. The processor 101 may be configured using at least one of one or more a central processing units (CPU) and one or more a graphics processing units (GPU).

In an embodiment, the electronic apparatus 10 may further include at least one of a storage 103, a network interface 105 that mediates data transmission and reception with an external device through a network. A system bus 104 serves as a data transmission/reception path between the processor 101, the memory 102, the storage 103, and the network interface 105. The memory 102 may be a volatile data storage such as a random-access memory (RAM). The storage 103 may be a nonvolatile memory such as a flash memory or a data storage device such as a hard disk.

The storage 103 may store a semantic tree 131 and a representative data 132 for each class. Each node of the semantic tree 131 may correspond one-to-one to a keyword, and each node is connected to each other in a parent/child relationship according to a hierarchical connection relationship between the keywords. The keyword of each node may correspond one-to-one to a class of a training data set. Specific examples of the semantic tree 131 will be described later with reference to FIG. 6 and the like.

The representative data 131 for each class is representative data of each class of the training data set. For example, when the training data set is an image set for object recognition, a representative data of a class "eagle" refers to a representative image in which an eagle is represented. Also, when feature data extracted from the representative data of the class 'eagle' is mapped to an embedding space, it becomes an anchor point of the class "eagle'". As another example, when the training data set is a voice set for voice recognition, the representative data of the class "eagle" refers to a representative voice of the eagle. Also, when feature data extracted from the representative voice sound of the class "eagle" is mapped to the embedding space, it becomes an anchor point of the class "eagle".

In one embodiment, during machine learning for generating metric, representative data for each class may be separately provided. In this case, machine learning is performed by using representative data provided, and if there is no representative data provided, the representative data 131 for each class stored in the storage 103 may be used as default data.

The storage 103 may further store the metric generating program 130A. A metric generator 130A may include an executable binary file (not illustrated), and the executable binary file is loaded into the memory 102 together with the metric generator 130A. In FIG. 2, a metric generating program 130B is stored in the memory 102. When the metric generating program 130B is executed, the semantic tree 131 may be referenced from time to time. Therefore, the semantic tree 131 may also be loaded and stored in the memory 102 in order to improve execution speed.

The storage 103 may also store a machine learning (ML) parameter set 1340. The ML parameter set 1340 is data defining a classifying model generated as a result of machine learning, and may be a parameter set for defining the artificial neural network when the classifying model is a neural network-based model.

The electronic apparatus 10 may perform metric learning for determining the distance function, or machine learning for determining the distance function and generating the classifying model based on the embedding space in which the distance function is reflected, by executing at least one of a metric learning instruction 1301, a semantic tree interface instruction 1302, a classification learning instruction 1303, and a model generation instruction 1304 included in the metric generating program 130B. Hereinafter, an operation related to the machine learning that may be performed by the electronic apparatus 10 will be described.

Instructions in the disclosure refer to a series of instructions grouped by function, executed in the processor.

Metric learning with improved performance that can be executed by the electronic apparatus 10 will be described.

Figure 3:
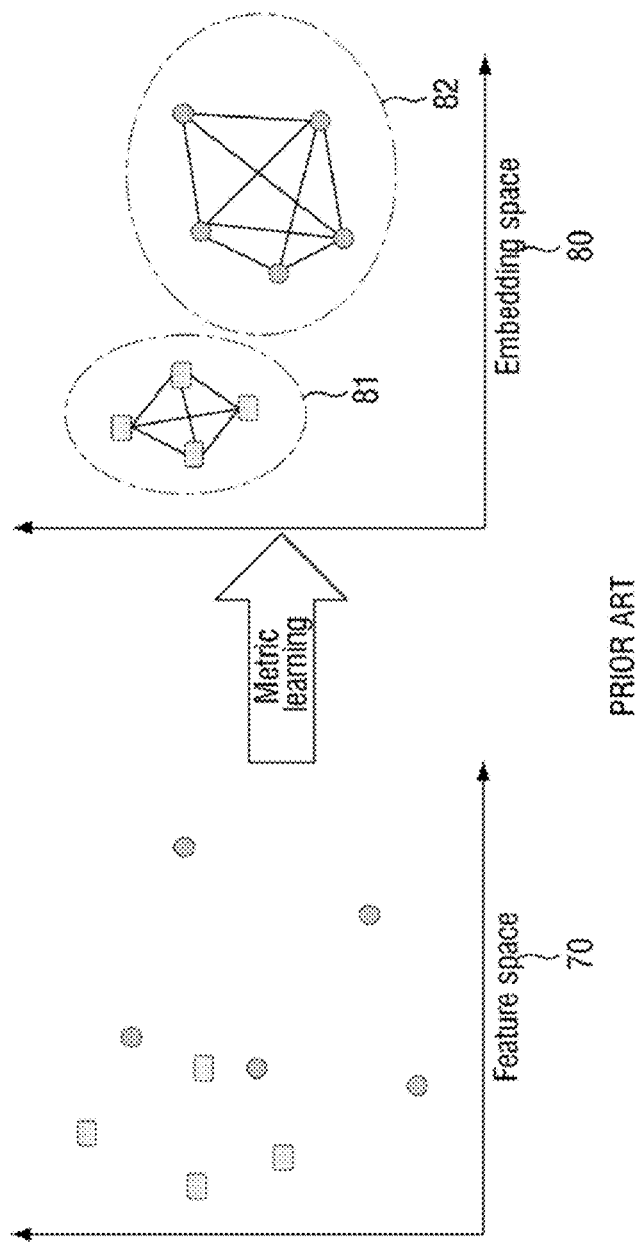
FIG. 3 is a view illustrating a metric learning according to prior art.

FIG. 3 is a view illustrating metric learning according to the prior art. FIG. 3 illustrates two classes of feature points mapped to feature space 70. A first class is indicated by a rectangle and a second class is indicated by a circle. Distances between each point in the feature space 70 may be measured using a well-known universal distance function such as i) Euclidean distance, ii) Mahalanobis distance, or the like. However, the general-purpose distance function often does not adequately express a similarity or dissimilarity between training data. This is because the general-purpose distance function is a distance function that can be used generally in various situations, and is not optimized for training data included in training target data set. Reflecting this, the feature points of the first class and the feature points of the second class are partially mixed in the feature space of FIG. 3. In this case, clustering may not be made clearly, and as a result, an accuracy of the classifying model may decrease and complexity thereof may increase.

In order to solve this problem, if metric learning according to the prior art is performed, a distance function optimized for the training target data set is obtained. Then, a feature space in which distance measurement is made according to the distance function may be constructed. The feature space in which the distance measurement is made according to the distance function generated by the metric learning is referred to as an embedding space 80.

As illustrated in FIG. 3, a distance between feature points of the first class on the embedding space 80 is shorter than a distance between feature points of the first class on the feature space 70. Also, a distance between feature points of the second class on the embedding space 80 is shorter than a distance between feature points of the second class on the feature space 70. As the distances between the feature points of the same class become closer, a cluster 81 of the first class and a cluster 82 of the second class become more clearly separated, thereby improving an accuracy of the classifying model, and also reducing computing load required for calculations.

However, in the case of metric learning according to the prior art, a large number of training data must be learned in order to obtain a distance function with high accuracy. This problem of prior art metric learning is solved by improved performance metric learning, which will be described below with reference to FIG. 4.

In addition, a distance function generated as a result of metric learning reflects only similarity or dissimilarity between classes, does not consider a degree of similarity or dissimilarity, and also does not consider semantics of class. This metric learning problem of the prior art is solved by improved performance metric learning, which will be described below with reference to FIGS. 6 to 11.

Figure 4:
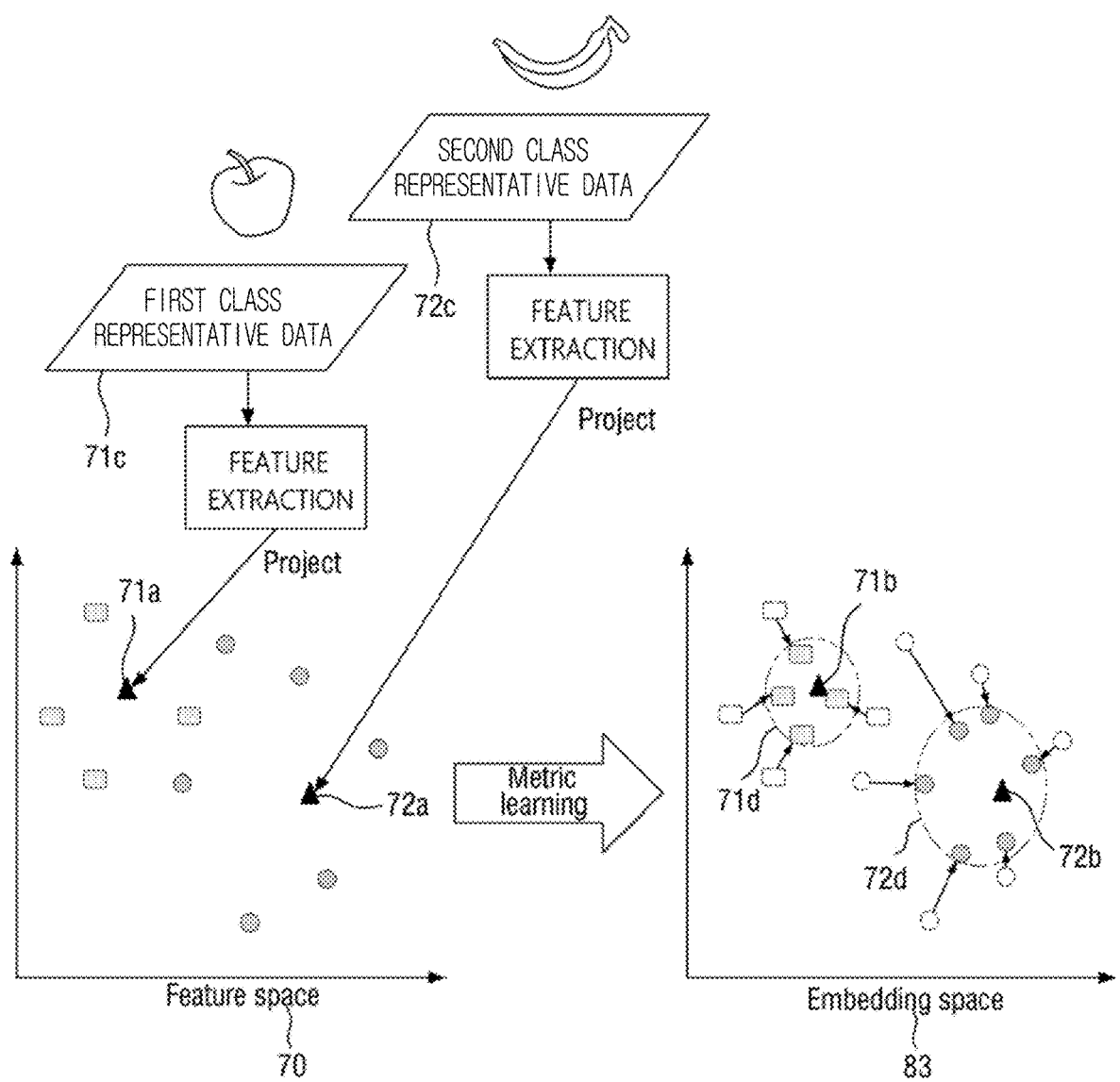
FIG. 4 is a view illustrating metric learning with improved performance applied to an electronic apparatus or a method according to some embodiments.

Referring to FIG. 4, metric learning of improved performance applied to an electronic apparatus or method according to some embodiments of the disclosure will be described.

Unlike metric learning according to the prior art, which simply generates a distance function that makes similar feature points closer together, the improved performance of metric learning according to some embodiments of the disclosure makes the feature points of the training data closer to anchor point. For this operation, a loss function applied to the metric learning may be set by defining a loss value as follows. The loss function may have low loss as the feature points of training data of the first class and the anchor point are close, and may have high loss as the feature points of training data of the second class, different from the first class, and the anchor point are close.

As illustrated in FIG. 4, the anchor points 71A and 72B of each class may not any one of the training data, but may be mapped to feature data extracted from separate representative data 71C and 72C. As described above, the representative data 71C and 72C may be data inputted at the start of metric learning. In addition, if the anchor points 71A and 72A correspond to a specific node (corresponding to a specific class) of the semantic tree, the representative data for each class may be basically applied even if the representative data 71C and 72C are not input.

The metric learning of the improved performance according to the embodiment has an effect that a distance function is generated such that clusters of each class are sufficiently concentrated even with a smaller number of training data than the prior art.

When metric learning according to the embodiment is applied to the feature space 70, a distance function (not illustrated) constituting an embedding space 83 will be generated. FIG. 4 illustrates that, due to the generated distance function, feature points of the first class are closer to the anchor point 71B of the first class, while feature points of the second class are closer to the anchor point 72B of the second class. As positions of the feature points of each class are updated to be more densely concentrated than before the metric learning, areas of clusters 71D and 72D of each class becomes narrower on the embedding space 83. Accordingly, the clusters 71D and 72D of each class are more clearly separated from the metric learning results according to the prior art, thereby improving the accuracy of the classifying model and reducing the computing load required for calculations.

Figure 5:
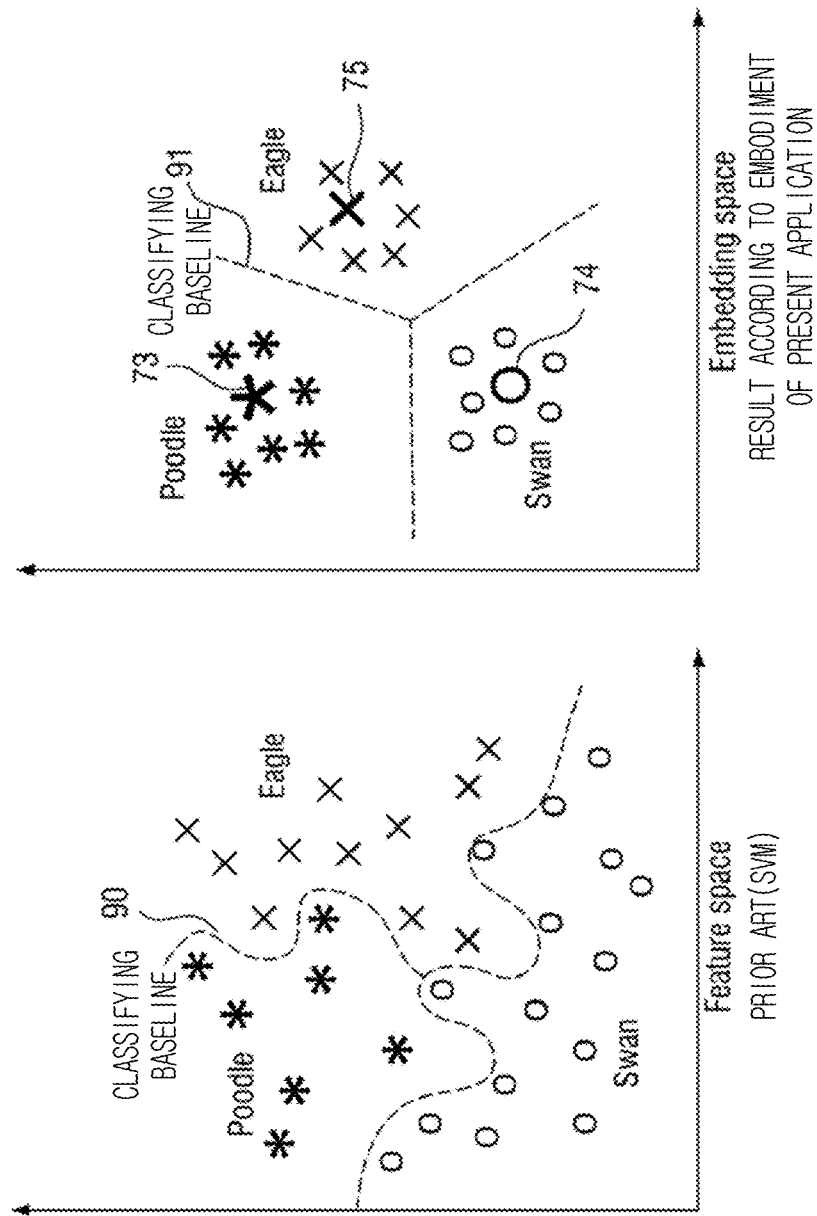
FIG. 5 is a view illustrating a performance of improved metric learning applied to an electronic apparatus or a method according to some embodiments in comparison with a classification algorithm according to prior art.

FIG. 5 is view illustrating metric learning with improved performance with reference to FIG. 4 in comparison with a classification algorithm according to the prior art. Well-known classification algorithms, such as support vector machine (SVM), generate a classifying baseline 90 for each class on the feature space. The classifying baseline 90 may be nonlinear. However, as illustrated in FIG. 5, if the classifying baseline 90 requires a high-dimensional function since clustering for each class is not well performed, the classifying model will require a high computing load.

Meanwhile, if the classifying model is trained using a result of the metric learning described with reference to FIG. 4, a required computing load is significantly reduced. As illustrated in FIG. 5, the feature points are highly and densely clustered based on anchor points 73, 74, and 75 of each class, so that a complexity of a classifying baseline 91 is relaxed compared to the prior art.

In metric learning according to some embodiments of the disclosure, a position of the anchor point is determined in consideration of the semantic relationship between classes corresponding to the anchor point. Hereinafter, a description regarding that matter will be described with reference to FIGS. 6 to 10.

Figure 6:
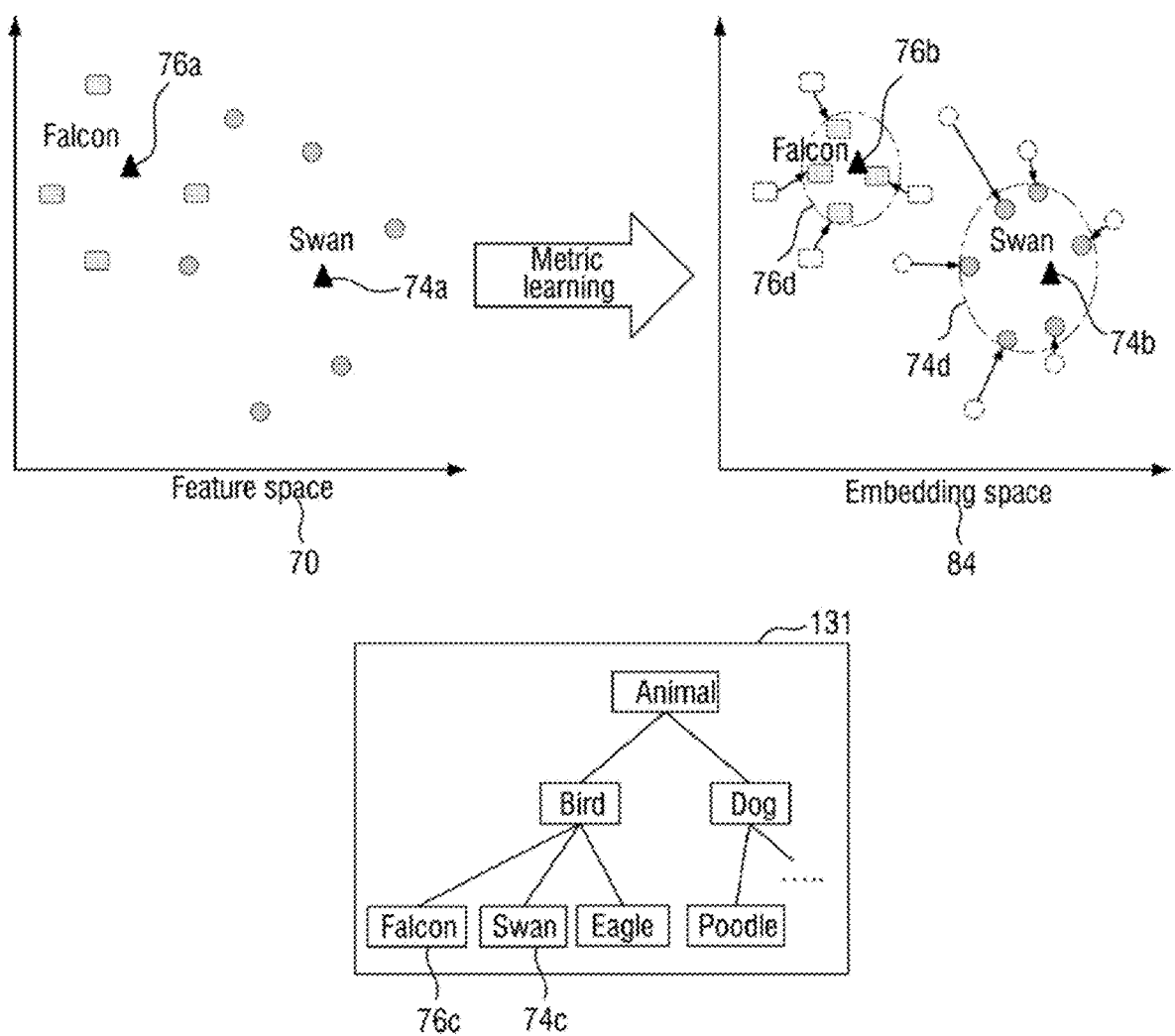
FIG. 6 is a view illustrating a feature of metric learning of improved performance applied to an electronic apparatus or a method according to some embodiments.
Figure 7:
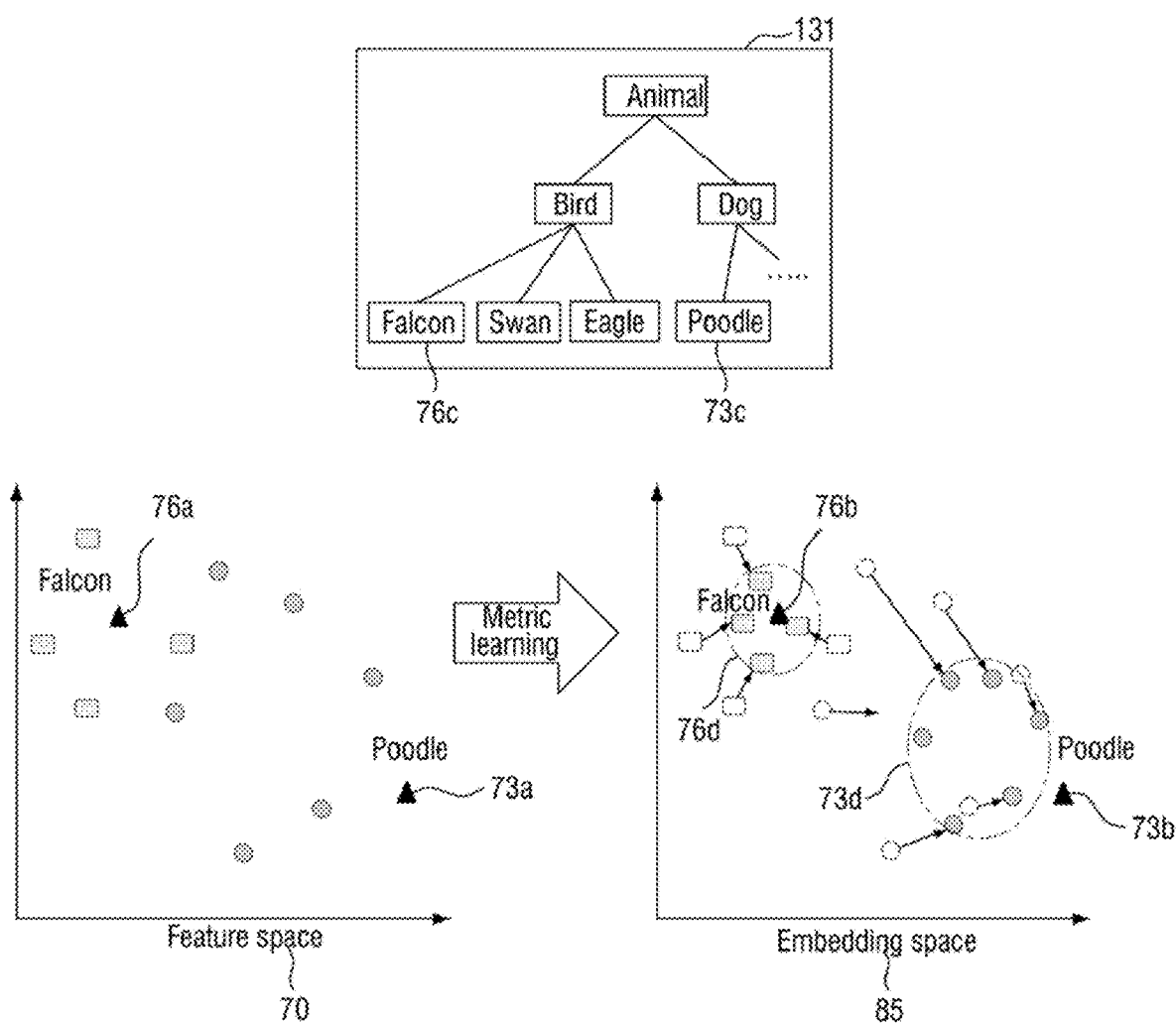
FIG. 7 is a view illustrating a point in which a relative position between two anchor points is determined according to a semantic relationship between anchor points in a metric learning process applied to an electronic apparatus or a method according to some embodiments of the disclosure.

A distance on the feature space 70 between the anchor point 76A of the falcon node 76C and the anchor point 73B of the poodle node 73C, illustrated in FIG. 7, is farther than a distance on the feature space 70 between the anchor point 76A of the falcon node 76C and the anchor point 76A of the swan node 74C, illustrated in FIG. 6. This is because the semantic relationship between the falcon class and the swan class is closer than the semantic relationship between the falcon class and the poodle class. In other words, on the semantic tree, the distance between the falcon node 76C and the swan node 74C is closer than the distance between the falcon node 76C and the poodle node 73C.

In one embodiment, the distance between two nodes on the semantic tree may be set to be farther away as the number of nodes or the number of edges between the two nodes increase. For example, if the distance is set to the number of edges between nodes, the distance between the falcon node 76C and the swan node 74C is 2 (edge between falcon-bird, edge between bird-swan) and the distance between the falcon node 76C and the poodle node 73C is 4 (edge between falcon-bird, edge between bird-animal, edge between animal-dog, edge between dog-poodle).

FIG. 6, adjacent feature points are closer to the falcon anchor point 76B to form the falcon cluster 76D, and adjacent feature points are closer to the swan anchor point 74B to form the swan cluster 74D. As such, the anchor point becomes a reference point for increasing a cohesion of the cluster. Accordingly, in order to improve classifying performance, it is important that the anchor points are properly spaced from each other. In the embodiment, since positions of each anchor point is determined in consideration of the semantic relationship, the anchor points are induced to be properly spaced from each other.

In FIG. 7, adjacent feature points are closer to the falcon anchor point 76B to form the falcon cluster 76D, and adjacent feature points are closer to the poodle anchor point 73B to form the poodle cluster 73D. A position of the poodle cluster 73D is farther from the falcon cluster 76D than a position of the swan cluster 74B of FIG. 6. In addition, the feature points of the poodle class are farther from the falcon cluster 76D than before performing the metric learning according to the embodiment. This reflects the semantic relationship between the falcon and the poodle. In addition, the anchor point 76B of the falcon class and the anchor point 73B of the poodle class serve as a cluster reference point firstly reflecting the semantic relationship, so that the position of the falcon cluster 76D and the poodle cluster 73D also reflects relationships on the semantic tree.

FIGS. 6 and 7 illustrate only two anchor points, respectively, but as many anchor points as the number of classes of training data to be trained will be arranged in the feature space 70, and positions of anchor points will be determined in order that distances between all pairs of anchor points to satisfy the semantic relationship. In other words, as the number of classes increases, the positions of each anchor point more accurately reflects distances between each corresponding node of the semantic tree.

Figure 8:
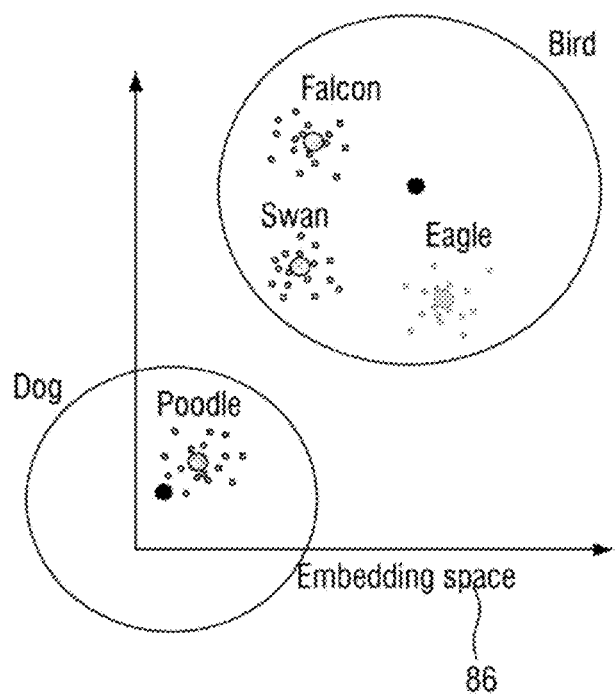
FIG. 8 is a view illustrating a characteristic of metric learning reflecting a semantic relationship applied to an electronic apparatus or a method according to some embodiments of the disclosure.
Figure 8:
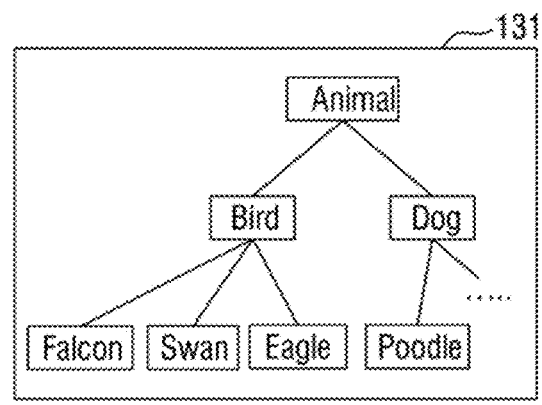

As a result, as illustrated in FIG. 8, three or more anchor points may be reflected to obtain a learned distance function, and a cluster area of an upper layer including a cluster area of lower nodes of the semantic tree on an embedding space 86 in which the distance function is reflected may be formed. If a plurality of feature data can be extracted from data to be analyzed using the feature above, a hierarchical understanding in consideration of the semantics of the data to be analyzed may be possible in a way of identifying upper/lower nodes on the semantic tree 131 indicated by each feature data, identifying higher nodes to which the identified lower nodes belong, or the like. This will be described later with reference to FIG. 16.

In an embodiment, the positions of the anchor points may be updated in the metric learning process. This will be described with reference to FIGS. 9 to 11.

Metric learning, one of machine learning, also inputs each training data to a neural network, evaluates the data output from the neural network using a loss function, and iterates operations that adjust a weight of the neural network using the result for all training data set.

In an absence of the distance function, anchor points are mapped onto a simple feature space. Therefore, at this time, a current embedding space becomes a feature space. However, when the distance function is obtained and an embedding space reflecting the obtained distance function is formed, the current embedding space is updated with the formed embedding space.

Figure 9:
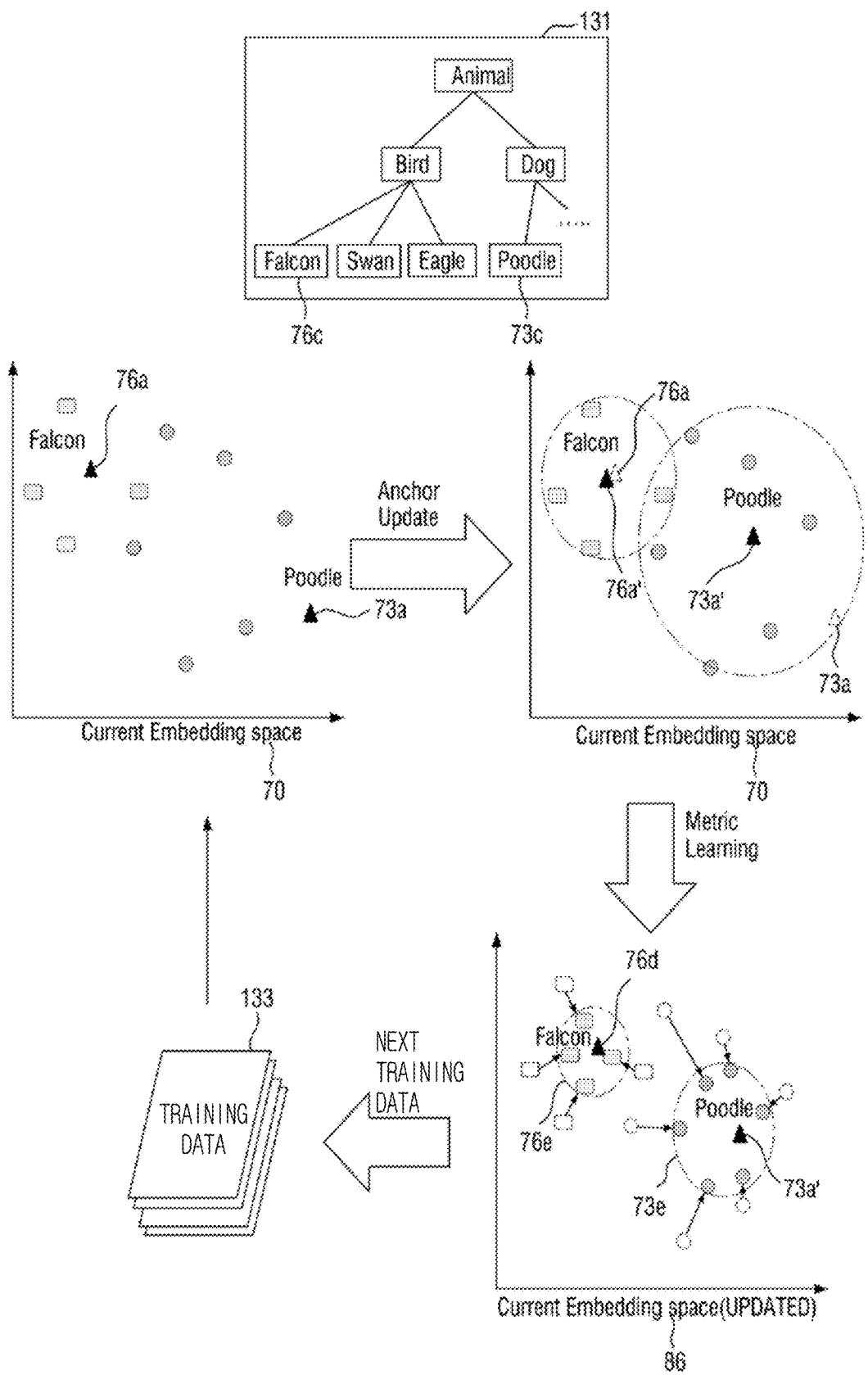
FIG. 9 is a view illustrating performing an anchor point update in a metric learning process applied to an electronic apparatus or a method according to some embodiments of the disclosure.

FIG. 9 illustrates that, after the anchor point 76A of the falcon class and the anchor point 73A of the poodle class are mapped to the current embedding space 70, the anchor point of the falcon class is updated 76A' according to an anchor update process by reflecting positions of the feature points of the training data of the flacon class, and the anchor point of the poodle class is updated 73A' by reflecting positions of the feature points of the training data of the poodle class.

In one embodiment, by means of the update for the first class, the position of the anchor point of the first class may be updated with representative values of feature points of the training data of all the first classes inputted up to the anchor point of the first class and the current iteration. For example, the representative value may be an average value or a median value.

By the update, it can be confirmed that the problem that the separation between the anchor point position of the poodle class and the position of the feature point of the training data is improved.

As a result of the metric learning, the distance function according to the current iteration may be updated such that the feature points of the falcon class are closer to the updated anchor point 76A', and the feature points of the poodle class are closer to the updated anchor point 73A'. In FIG. 9, an embedding space 86 in which the updated distance function is reflected is illustrated.

The metric learning may proceed to the next iteration if a next training data 133 to be learned remains.

As described above, the anchor point is the feature data of the representative data mapped to the feature space (or the current embedding space when the iteration of learning is in progress). No matter how careful about choosing the representative data, it may not be an ideal representative point for all of the training data of the corresponding class. Therefore, when iterating the learning by continuously maintaining the first anchor point, there is a problem that the position of each cluster in the embedding space does not accurately reflect the training data if the first anchor point maintains and iterates over again. Nevertheless, however, the anchor point may need to serve as a reference point for the position of the feature points of the training data.

In an embodiment, in order to satisfy both of the two opposite goals, the position of the anchor point of the first class may be updated by reflecting the position of the feature point of the first class, but may not update the anchor point at an initial learning. The initial learning consists of an iteration of a first number of times from the start of learning. At this time, even if the position of the anchor point is updated, it may be possible to reduce overhead caused by too frequent update of the anchor point by updating the position of the anchor point once every iteration of two or more second number of times.

In an embodiment, the first number of times defining an interval of the initial learning may be set based on a type of the training data. In other words, the first number of times may be set as a first value when the type of the training data is a first type, and may be set as a second value when the type of the training data is a second type. For example, the first type may be image data, and the second type may be audio data.

In one embodiment, after updating the embedding space according to the metric learning, the distance between the clusters may be adjusted in consideration of semantic relationship between clusters, and then proceeded to the next iteration. In this regard, referring to FIG. 10, after updating the embedding space according to the metric learning, positions of three clusters 73E, 76E, and 78E are revised according to a cluster position revision. By revising the position between the clusters, there is an effect that a damage of the semantic relationship due to the anchor point update can be prevented from gradually expanding.

Figure 10:
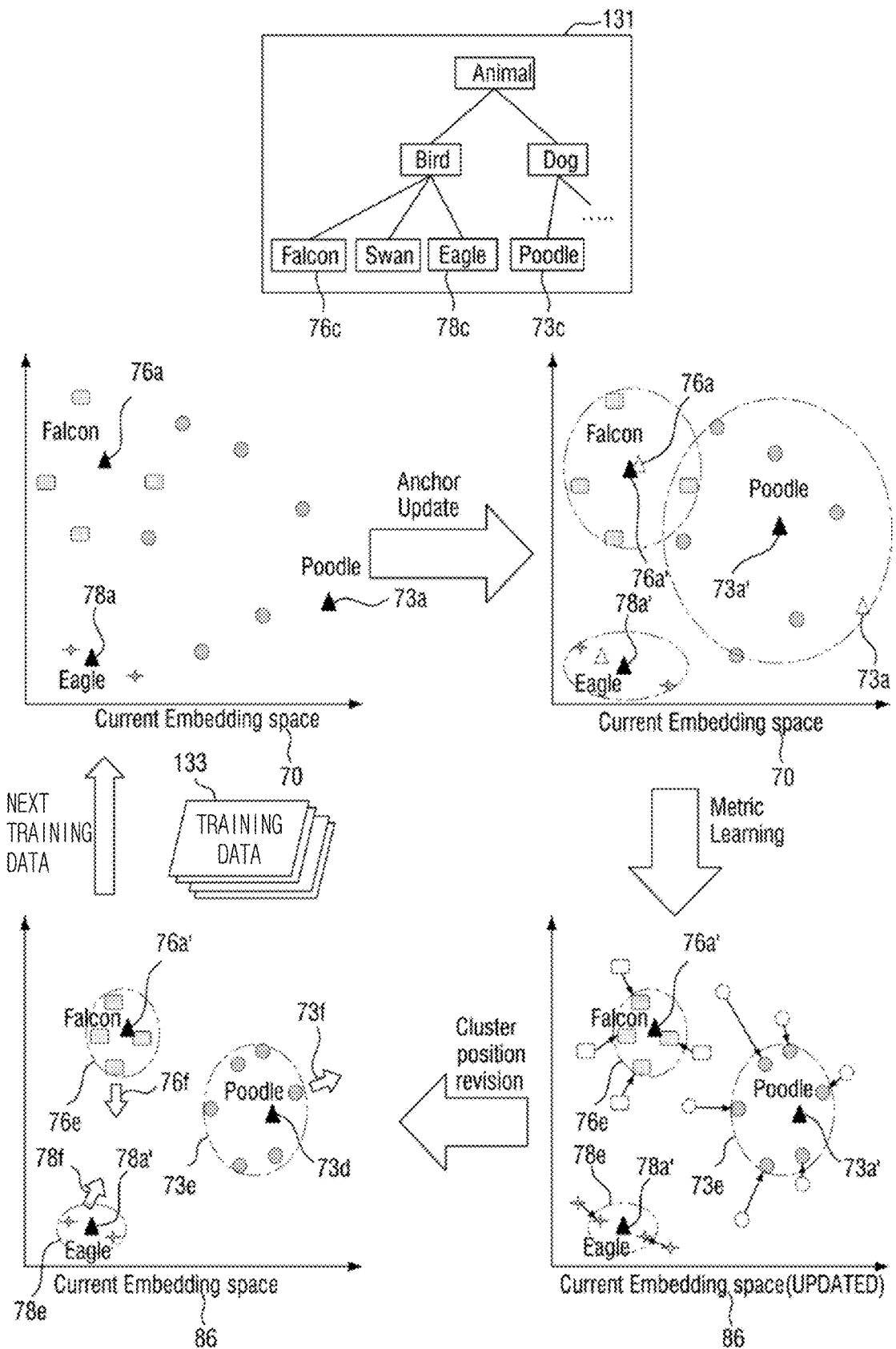
FIGS. 10 to 11 are views illustrating performing a cluster position update after an anchor point update and an embedding space update in a metric learning process applied to an electronic apparatus or a method according to some embodiments of the disclosure.
Figure 11:
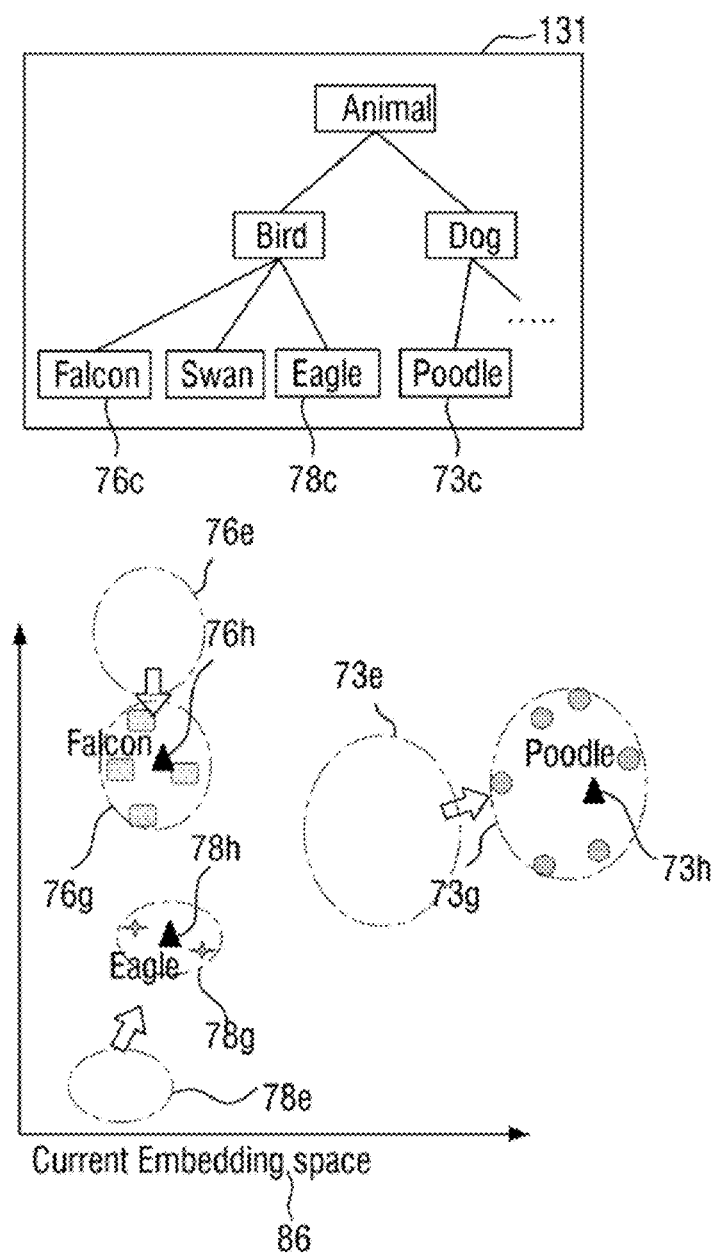

Referring to FIG. 10, a proper distance between the falcon cluster 76E and the eagle cluster 78E is determined based on a distance between the falcon node 76C and the eagle node 78C of the semantic tree 131. Since the determined distance is shorter than the distance between the two clusters 76E and 78E on the current embedding space, the two clusters 76E and 78E move in a direction closer to each other 76F and 78F. In addition, since the poodle cluster 73E has approached the Falcon cluster 76E and the eagle cluster 78E more than the proper distance determined according to the semantic tree 131, the poodle cluster 73E moves 73f away from the two clusters 76E and 78E. FIG. 11 illustrates positions 73G, 76G, 78G of the three clusters revised according to the cluster position revision of FIG. 10.

The metric learning according to the embodiment described with reference to FIG. 10 proceeds to the next iteration if the next training data 133 to be learned remains after the cluster position revision. In the next iteration, feature points of the next training data may be further mapped while the current embedding space includes three clusters of revised positions 73G, 76G, and 78G.

Hereinafter, the metric learning-related operation of the electronic apparatus described above will be described with reference to each operation of instructions included in the metric generating program.

Figure 12:
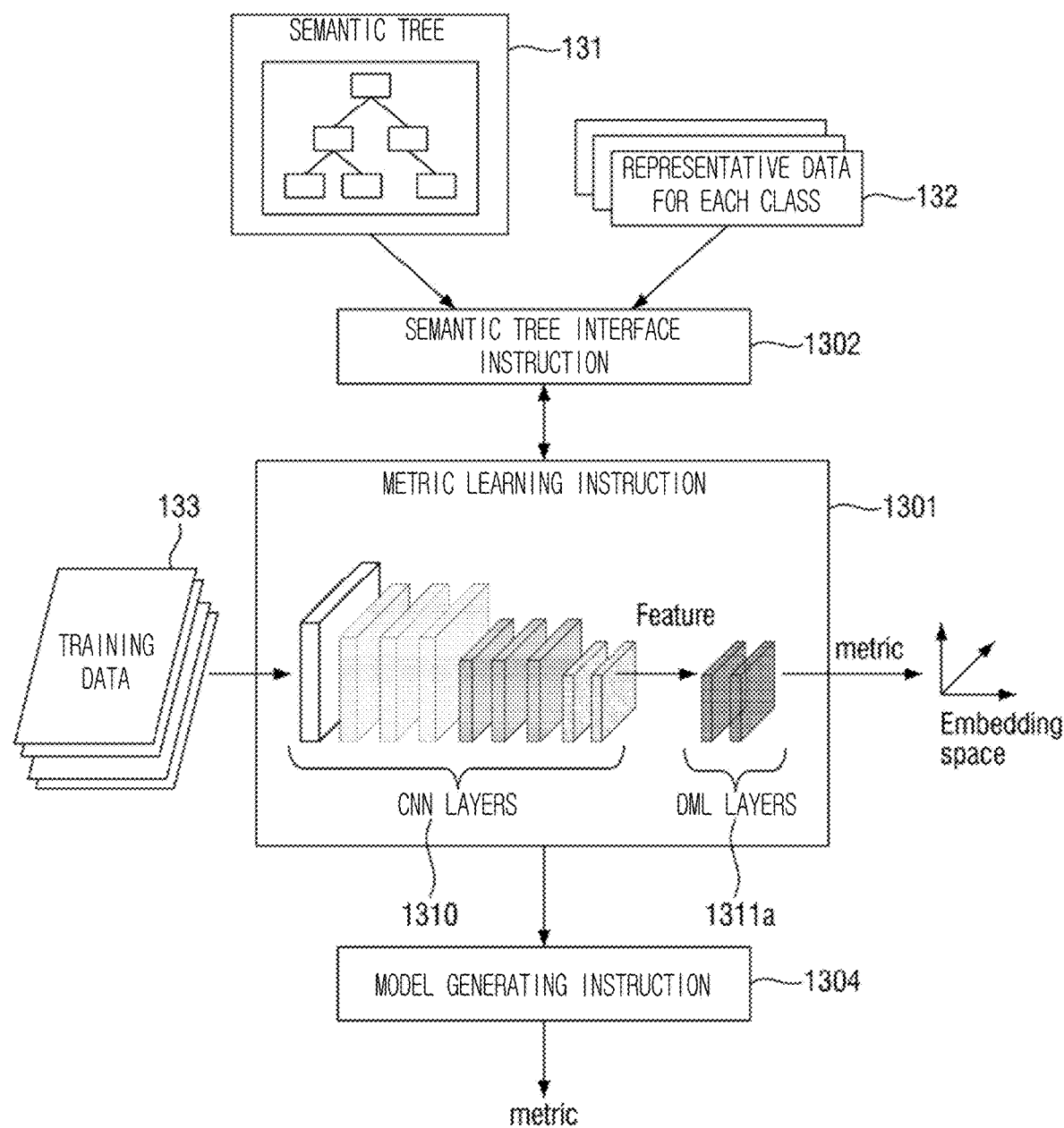
FIGS. 12, 13, and 14 are views specifically illustrating an example of an operation of a metric generation program of an electronic apparatus according to an embodiment of the disclosure.

An operation that the matric generating program outputs a distance function (i.e., a metric) obtained as a result of training the training data set is described with reference to FIG. 12.

As described above, in some embodiments, the semantic tree 131 may be inquired during the metric learning, and if separate class representative data for forming anchor point is not input, the representative data 132 for each class stored in the electronic apparatus may be used. A semantic tree interface instruction 1302 returns the inquiry result of the semantic tree 131 or the representative data 132 for each class to the metric learning instruction 1301 in response to a request of the metric learning instruction 1302.

In one embodiment, the metric learning instruction 1301 may input the training data 133 into a convolutional neural network (CNN) layers 1310 to obtain a feature data of the input training data 133, and may input the obtained feature data in a deep metric learning (DML) layers 1311A to obtain a distance function related data output from the DML layers 1311A.

The metric learning instruction 1301 may train the CNN layers 1310 and the DML layers 1311A in the CNN layers 1310 collectively, or only the DML layers 1311A by separating from the CNN layers 1310.

Note that other machine learning algorithms may be used in place of convolution neural network (CNN) layers 1310 to obtain feature data of the training data in another embodiment.

The DML layers 1311A are deep learning-based artificial neural networks in which the metric learning described above is performed.

The model generation instruction 1304 packages and outputs distance function related data output from the DML layers 1311A in a predefined way. The output data may be transmitted to an external device through a network interface or stored in a storage device of the electronic apparatus in case it may be referred to later.

Figure 13:
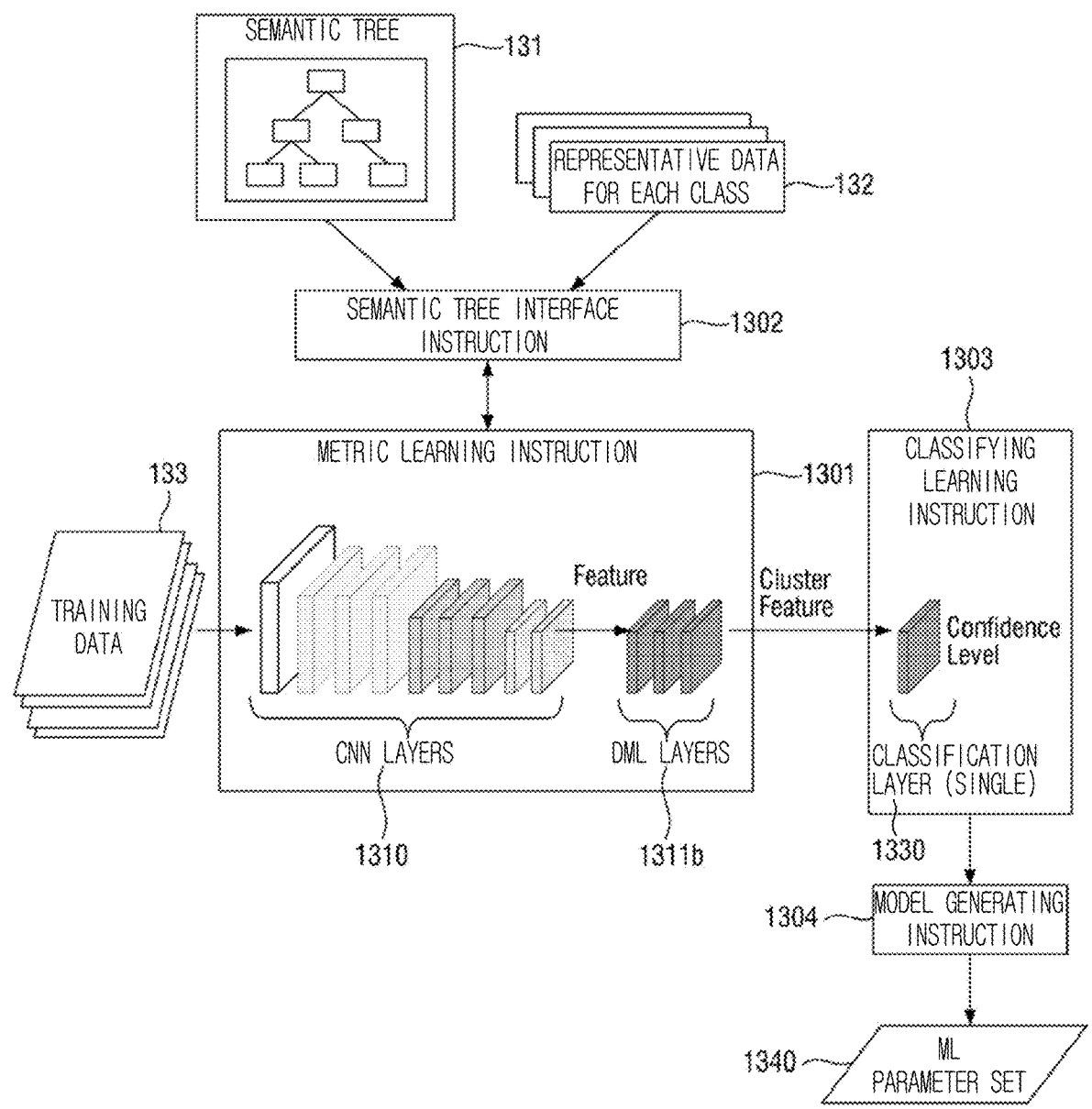

FIG. 13 describes that the metric generating program generates and outputs an embedding space-based classifying model that reflects a distance function (i.e., a metric) obtained as a result of training a training data set.

The semantic tree interface instruction 1302 of FIG. 13 operates in the same manner as described with reference to FIG. 12. The metric learning instruction 1301 operates in the same manner as described with reference to FIG. 12 except that the DML layers 1311B are not the distance function generated as the result of metric learning, but further includes the layer outputting the cluster feature data reflecting the cluster formation result on the embedding space formed by reflecting the distance function contrast to the DML layers 1311A of FIG. 12.

The classification learning instruction 1303 generates a classifying model based on the distance function generated according to the metric learning instruction 1301. The classification learning instruction 1303 may train an object classification layer 1330 composed of a single layer that receives data output from the metric learning layers learned by the metric learning instruction 1301, in particular, the DML layers 1311B and outputs a confidence level for each class.

The reason that the classification learning instruction 1303 can train the classifying model using only a single layer is because the cluster feature data output from the DML layers 1311B reflects the clustering result that is sufficiently spaced apart from each other. Accordingly, since a complexity of calculation for calculating a confidence level for each class from the cluster feature data is low, the classifying model can be trained using only a single layer.

The model generation instruction 1304 outputs an ML parameter set 1340 that packages the data output from the classification training instruction 1303 in a predefined manner. The ML parameter set 1340 may include a parameter set for defining the CNN layers 1310, a parameter set for defining the DML layers 1311B, and a parameter set for defining the classification layer 1330. In other words, the ML parameter set 1340 may include data for generating a model that outputs a classification result of data by sequentially connecting the CNN layers 1310, the DML layers 1311B, and the classification layer 1330. Data output by the model generation instruction 1304 may be transmitted to an external device through a network interface, or may be stored in a storage device of the electronic apparatus in case of future reference.

Figure 14:
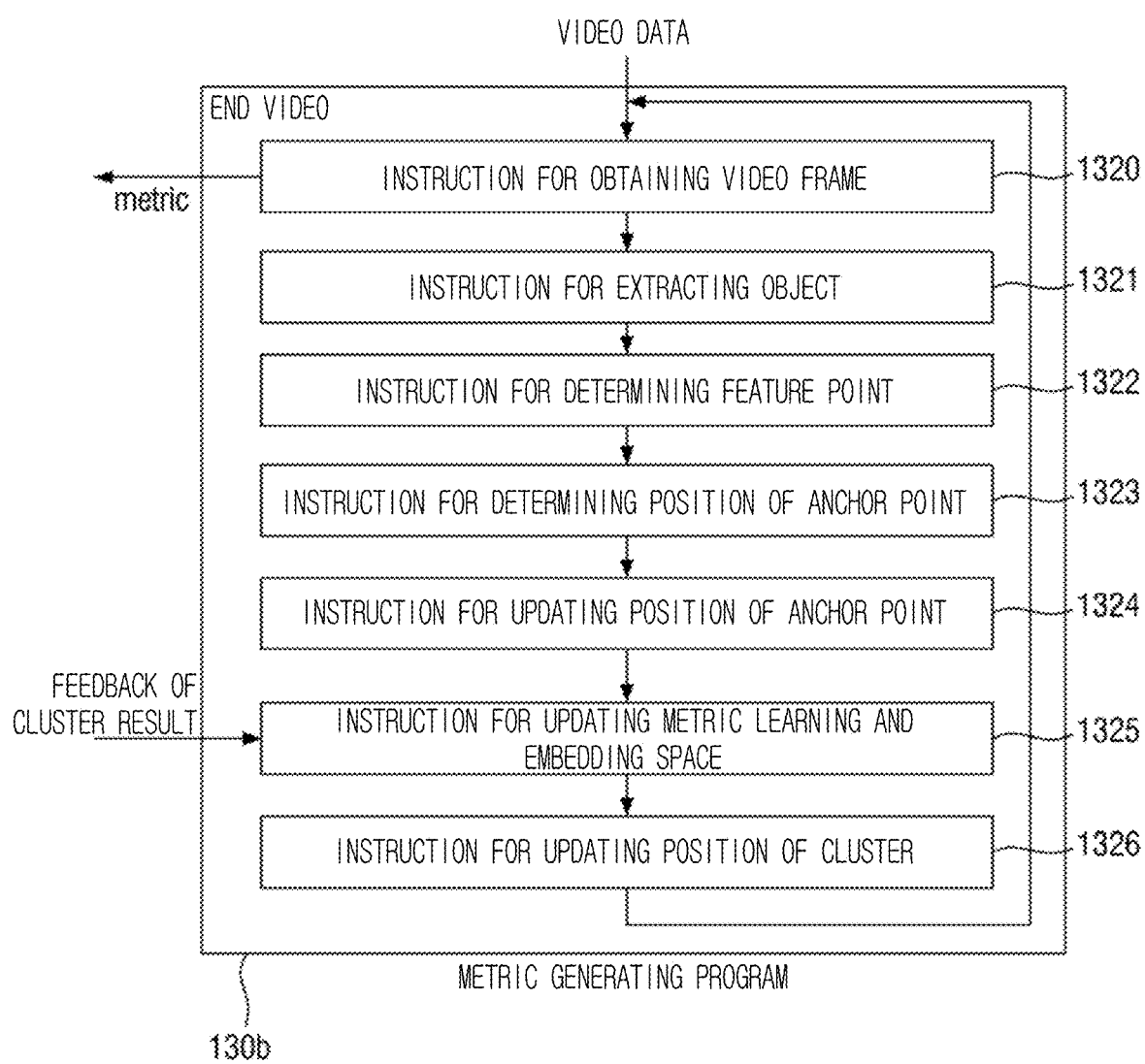

Hereinafter, FIG. 14 describes an embodiment that the metric generating program 130B performs an operation that metric learning for generating a model that classifies each object included in the video using a training data set including each frame image of the video. An embodiment of performing an operation will be described. An operation of the metric generating program 130B according to the present embodiment may be understood as a summary of the operation of the electronic apparatus described with reference to FIG. 10 in an instruction unit.

An instruction of obtaining video frame 1320 receives a video data and sequentially provides a frame image to an instruction of extracting an object 1321. If the next frame image of the video does not exist, a last distance function or cluster feature data on the last embedding space reflecting the last distance function may be output since the learning using the video is finished.

Although the instruction for obtaining the video frame 1320 and the instruction for extracting an object 1321 may be included in the metric generating program 130B according to the embodiment, note that the object extraction result may be provided by an external program.

The instruction for extracting an object 1321 extracts one or more object images from the provided frame image by using a known object extraction algorithm, and provides the extracted object image to the instruction for determining feature points 1322. The instruction for determining feature points 1322 outputs feature data of each of the object images using CNN layers, and adds the feature points by mapping to the current embedding space.

An instruction for determining positions of anchor points 1323 determines positions of anchor points of a plurality of classes by reflecting semantic relationship information between each class. The instruction for determining positions of anchor points 1323 may be performed to set an anchor point's initial position only at the start of the metric generating program, that is, when the metric learning begins, and may no longer be executed when the anchor point position update begins.

An instruction for updating positions of anchor points 1324 updates a position of each anchor point by reflecting the position of feature points adjacent to each anchor point.

An instruction for updating metric learning and embedding space 1325 performs a current iteration of metric learning that generates a distance function that causes each of the feature points to be closer to the nearest anchor point among the updated anchor points, and updates the embedding space by reflecting the generated distance function.

An instruction for updating positions of clusters 1326 updates positions on the embedding space of the cluster for each class composed of each anchor point and feature points adjacent to the anchor point by reflecting the semantic relationship information between the classes indicated by each anchor point. Then, the instruction for obtaining the video frame may be performed with the operation of providing an image of the next frame.

Meanwhile, in one embodiment, an instruction (not illustrated) for obtaining a user's feedback for an object cluster formation model generated as a result of learning by the metric generating program 130B (that receives a frame image of a video, and outputs a determination result of which cluster each object image included in the frame image belongs to) may be further performed. For this operation, using the feedback, a metric learning for updating the existing object cluster formation model, the instruction for updating embedding space 1325, and the instruction for updating positions of clusters 1326 may be performed. This embodiment may be understood as a form of incremental learning. The electronic apparatus that executes the metric generating program 130B according to the embodiment may be a user terminal.

Hereinafter, the configuration and operation of an electronic apparatus according to another embodiment of the disclosure will be described. The electronic apparatus according to the embodiment may be understood as an apparatus that executes a model created as a result of the machine learning performed in the above-described electronic apparatus. Hereinafter, as an embodiment, a configuration and an operation of an electronic apparatus that recognizes each object displayed on the currently displayed screen using the model during video playback, and understands a scene of the currently displayed screen using the recognition result of each object are described.

Figure 15:
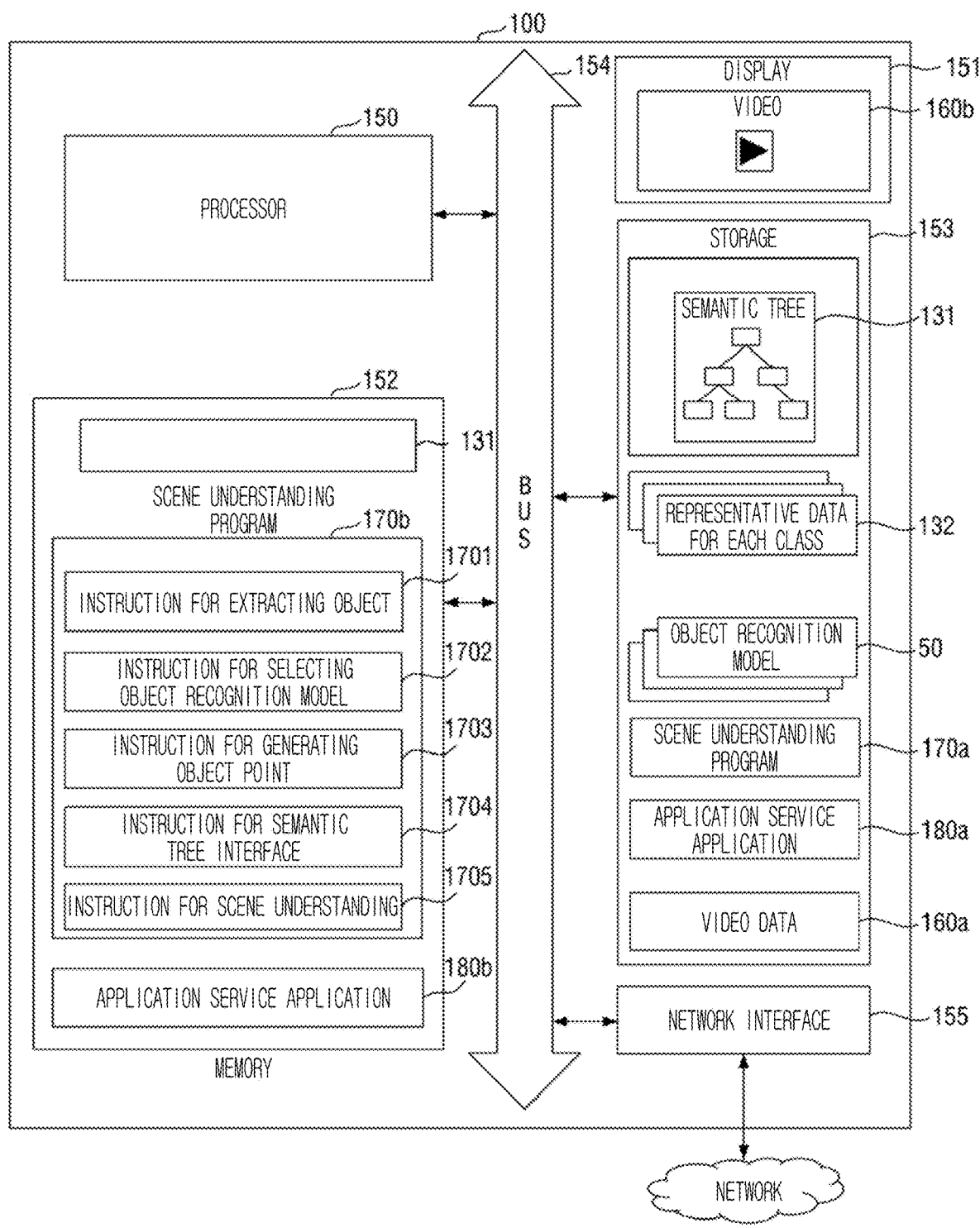
FIG. 15 is a block diagram illustrating a hardware of an electronic apparatus according to another embodiment of the disclosure.

An electronic apparatus 100 of FIG. 15 also has a hardware configuration similar to that of the electronic apparatus 10 of FIG. 2. Hereinafter, duplicate descriptions of common parts will be omitted.

A storage 153 may store an object recognition model 50 received through a network interface 155 from a video data 160A played on a display 151, the electronic apparatus of FIG. 2, or the like, a semantic tree 131, representative data 132 for each class, a scene understanding program 170A, and an application service application 180A.

The scene understanding program 170A is loaded and stored in the memory 152 170B. Hereinafter, the operation of the scene understanding program 170B will be described in units of instructions.

An instruction for extracting an object 1701 extracts an object from a current screen of a video 160B played through the display 151. Since it is enough to extract an object from an image displayed on the display 151, the image may be a frame of a video or a general image. Note that although the instruction for extracting an object 1701 may be included in the scene understanding program 170B according to the embodiment, the object extraction result may be provided by an external program.

An instruction for selecting an object recognition model 1702 selects one of the object recognition models 50 stored in a storage 153. The object recognition model 50 may be, for example, the ML parameter set 1340 described with reference to FIG. 13. In other words, the object recognition model 50 may map feature points of an object image on an embedding space in which a distance function reflecting semantic relationship information is reflected, and output a class of an object based on a position on the embedding space of the feature points.

The storage 153 may store a plurality of object recognition models 50. In this case, the instruction for selecting the object recognition model 1702 may select one of the plurality of object recognition models 50. The application object recognition model 50 to be applied may be fixed so that the operation of the instruction for selecting the object recognition model 1702 may not be required. Hereinafter, embodiments in which one of the plurality of object recognition models 50 are selected will be described.

In an embodiment, the plurality of object recognition models 50 may include a first object recognition model generated as a result of machine learning using a video of a first genre and a second object generated as a result of machine learning using a video of a second genre. The instruction for selecting object recognition model 1702 may select based on the type of the image. For example, the instruction for selecting object recognition model 1702 may obtain genre information from meta information of a video currently being played and select an object recognition model tagged with genre information corresponding to the genre information of the video. According to the embodiment, there is an effect that can increase an accuracy of the object recognition by matching the genre of the video to be input to the object recognition model and the video used for learning the object recognition model.

In another embodiment, the instruction for selecting the object recognition model 1702 may select any one of the plurality of object recognition models 50 based on information registered in a user profile (not illustrated) of the electronic apparatus 100. For example, according to the user profile, if an action is described in a preferred movie genre, the object for selecting the object recognition model 1702 may select the learned object recognition model using the video of the action genre.

In another embodiment, the instruction for selecting object recognition model 1702 may select any one of the plurality of object recognition models 50 according to the type of application service. The type of the application service may be determined according to the application service application 180B associated with the scene understanding program 170B. The application service may include providing additional content corresponding to the current scene understanding result determined by the scene understanding program 170B. Note that the application service application 180B may be a separate program from the scene understanding program 170B, but may be an instruction inside the scene understanding program 170B.

For example, the additional content may be a scene-customized advertisement, a search result using scene corresponding text, or a scene-customized media. For example, when the additional content is a scene-customized advertisement, the instruction for selecting object recognition model 1702 may select an object recognition model in which the advertisement target object image is intensively learned.

An instruction for generating an object point 1703 maps feature points of each of the plurality of objects extracted from the image to an embedding space using the selected object recognition model.

An instruction for scene understanding 1705 selects an anchor point closest to at least some of the mapped feature points extracted from the image, and understands the scene of the image by using a keyword of the selected anchor point. During this process, an inquiry of the semantic tree 131 is required, and an instruction for semantic tree interface 1704 may be in charge of the inquiry. This will be described in more detail with reference to FIG. 16.

Figure 16:
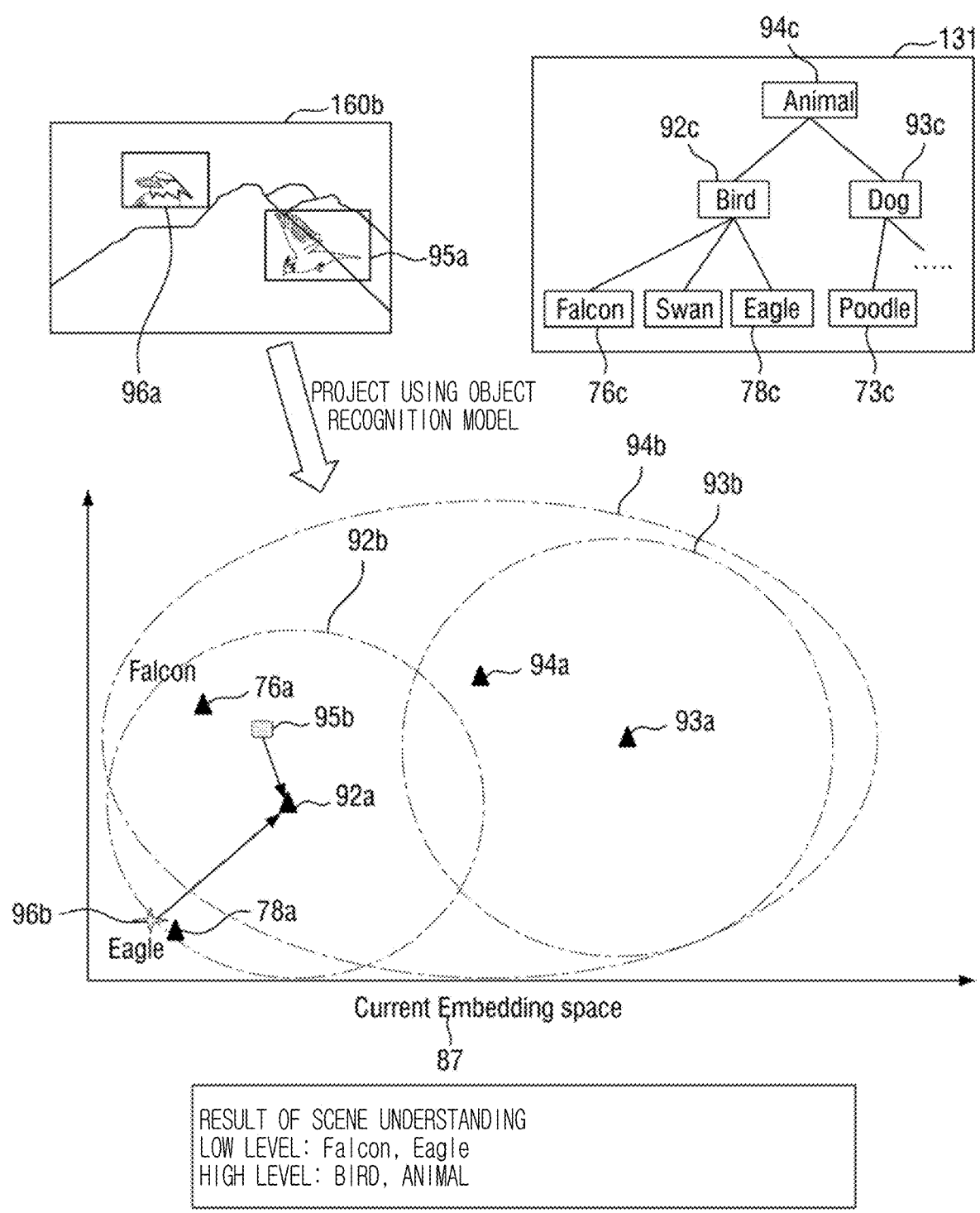
FIG. 16 is a conceptual diagram illustrating a scene understanding operation of an electronic apparatus of FIG. 15.

Referring to FIG. 16, when two objects 95A and 96A are extracted from the image 160bB, an instruction for generating object point 1703 may map a feature point 95B of an image of an object 95A to the embedding space 87 by using the object recognition model, and map a feature point 95B of an image of an object 96A. The instruction for scene understanding 1705 selects the anchor points 76A and 78A closest to the two feature points 95B and 96B in the embedding space 87.

Assume that the anchor point closest to the feature point 95B is the anchor point 76A of falcon, and the anchor point closest to the feature point 96B is the anchor point 76B of eagle. According to one embodiment, a parent node, a bird node 92C, of both node 76C corresponding to the falcon's anchor point 76A and node 78C corresponding to the eagle's anchor point 76B on the semantic tree 131 may be selected, and the scene understanding result may be determined as 'bird'. According to another embodiment, a higher level anchor point closest to the feature points 95B and 96B may be selected. The higher level anchor point refer to an anchor point corresponding to a node having a predetermined depth or less on the semantic tree 131. For example, when the predetermined depth is '1', the higher level anchor point closest to the feature points 95B and 96B may be an anchor point 92A of the bird node 92C. Therefore, even in this case, the scene understanding result may be determined as 'bird'.

In an embodiment, as illustrated in FIG. 16, the scene understanding result may be output by dividing its level hierarchically. This is possible because the embedding space 87 reflects a hierarchical semantic relationship.

According to an embodiment, when more than a predetermined number of objects are extracted from an image, the closest anchor point may be selected for some objects, and the scene of the image may be understood by using keywords of the selected anchor point. Some objects extracted from the image may have distant meanings, and if so, they act as noise in understanding the scene.

Hereinafter, methods performed by an electronic apparatus according to some embodiments of the disclosure will be described with reference to FIGS. 17 to 19.

Figure 17:
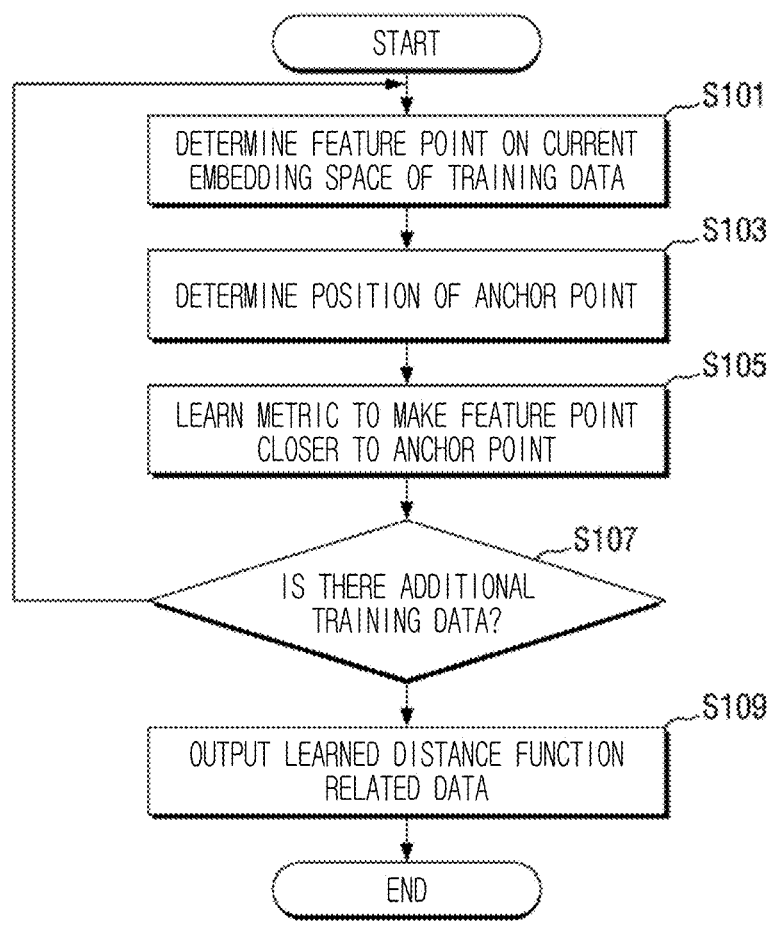
FIG. 17 is a flowchart illustrating a metric learning method according to another embodiment of the disclosure.

FIG. 17 is a flowchart of a metric learning method according to another embodiment of the disclosure. The method according to the embodiment may be performed by, for example, the electronic apparatus 10 illustrated in FIG. 2. Note that the metric learning method may include at least a part of operations of the electronic apparatus described with reference to FIGS. 2 to 5. Therefore, although there is no separate disclosure in the description of the metric learning method described below, the operation described above with reference to FIGS. 2 to 5 may be included in the metric learning method. In addition, in the following description of the methods, when there is no description of the subject of the operation, the subject may be interpreted as the electronic apparatus.

In an operation S101, a feature point on a current embedding space of the training data is determined. The training data is data that is the learning target of a current iteration among training data set, and the current embedding space is a feature space in which a distance function currently obtained is reflected. The current embedding space is a feature space to which a general purpose distance function is applied as an initial state if the distance function has not been obtained.

In an operation S103, a position of an anchor point is determined. If the position of the anchor point has already been determined, the determination of the anchor point position may not be performed. In addition, as described above, if the initial learning step has passed, the position of the existing anchor point may reflect the position of the feature point and be periodically updated.

In an operation S105, metric learning is performed so that the feature point is closer to the anchor point. As described above, the distance function is learned so that the feature point is closer to a reference point called the anchor point, there is an advantage that the learning speed is faster compared to the metric learning according to the prior art. The metric learning method according to the embodiment, if the next training data to be learned remains S107, the method proceeds to the next iteration, and if there is no next training data to learn, distance function related data is output as a result of learning S109.

Figure 18:
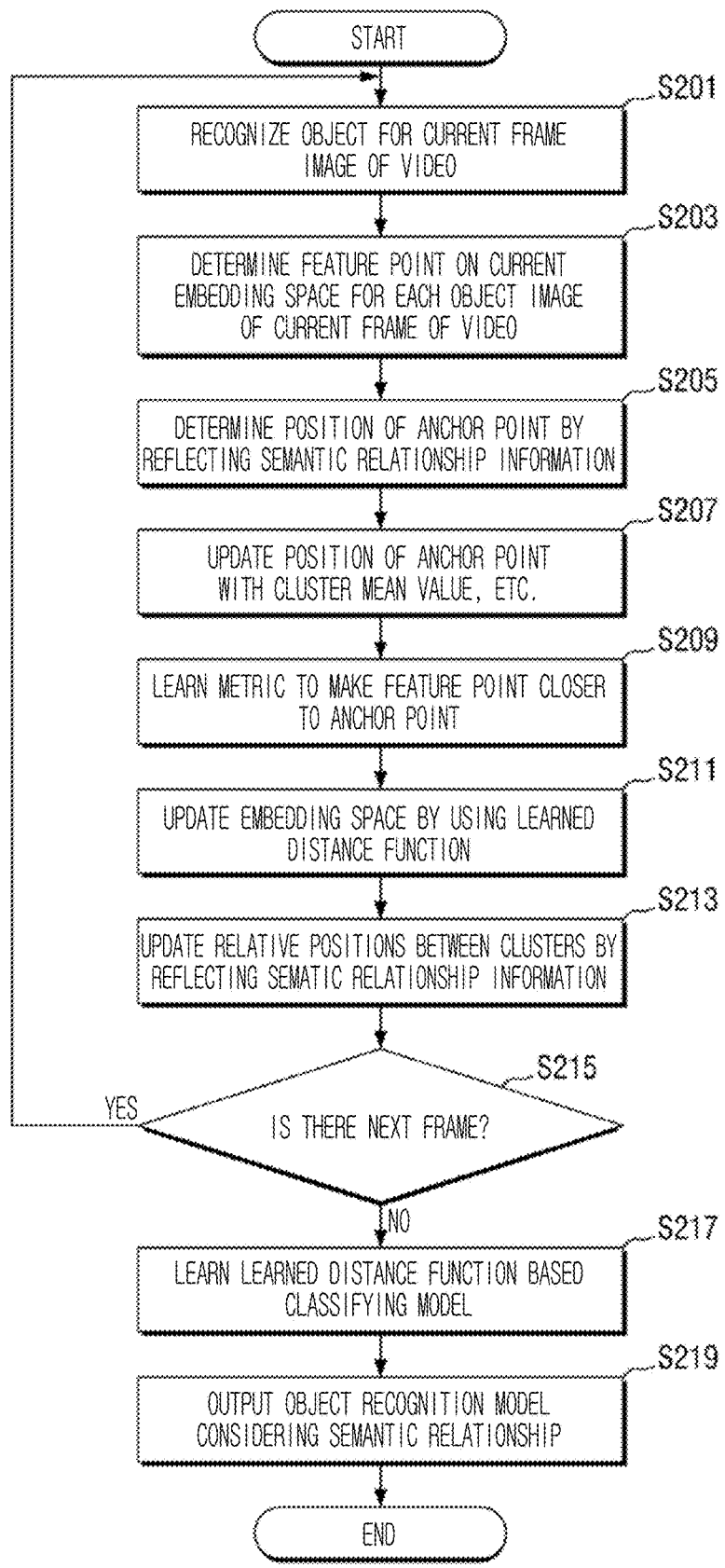
FIG. 18 is a flowchart illustrating a method of generating an object recognition model according to another embodiment of the disclosure.

FIG. 18 is a flowchart illustrating a method of generating an object recognition model according to another embodiment of the disclosure. The method according to the embodiment may be performed, for example, by the electronic apparatus 100 illustrated in FIG. 2. Note that the operation of the electronic apparatus described with reference to FIGS. 2, 10, and 14 may be included in the method of generating the object recognition model. Accordingly, although there is no separate disclosure in the description for the method of generating the object recognition model described below, the operations described above with reference to FIGS. 2, 10, and 14 may be included in the method of generating the object recognition model. In addition, in the following description of the method, when there is no description for a subject of the operation, the subject may be interpreted as the electronic apparatus.

In an operation S201, object recognition on the current frame image of the video is performed. As described above, an object recognition result may be provided from an external program.

In an operation S203, a feature point on the current embedding space for an image of each object is determined. In addition, in an operation S205, a position of the anchor point is determined by reflecting semantic relationship information. Unlike the one illustrated in FIG. 18, the operation S205 may be performed before the operation S203.

In an operation S207, the position of the anchor point is updated to an average value of a cluster and the like. In an operation S209, metric learning is performed so that the feature points are closer to the anchor point of the updated position. Through the metric learning, CNN layers for extracting feature data of an object image and DML layers for metric learning may be learned. In an operation S211, a current embedding space is updated by using the distance function obtained by the metric learning.

In an operation S213, in order to prevent the semantic relationship information from being damaged according to the update of the anchor point position, relative positions between the clusters are modified by reflecting the semantic relationship information.

In the method of generating the object recognition model according to the embodiment, if the next frame to be learned remains S215, the next iteration may be proceeded. If learning is completed up to the last frame of the video, the classifying model is trained based on the distance function learned in the operation S217. Through the learning of the classifying model, an object classification layer composed of a single layer that receives data output from the metric learning layer and outputs a confidence level for each class may be learned.

In an operation S219, data for the object recognition model is output. The output data may include the learned parameter sets of the CNN layers, the DML layers, and the object classification layer.

Figure 19:
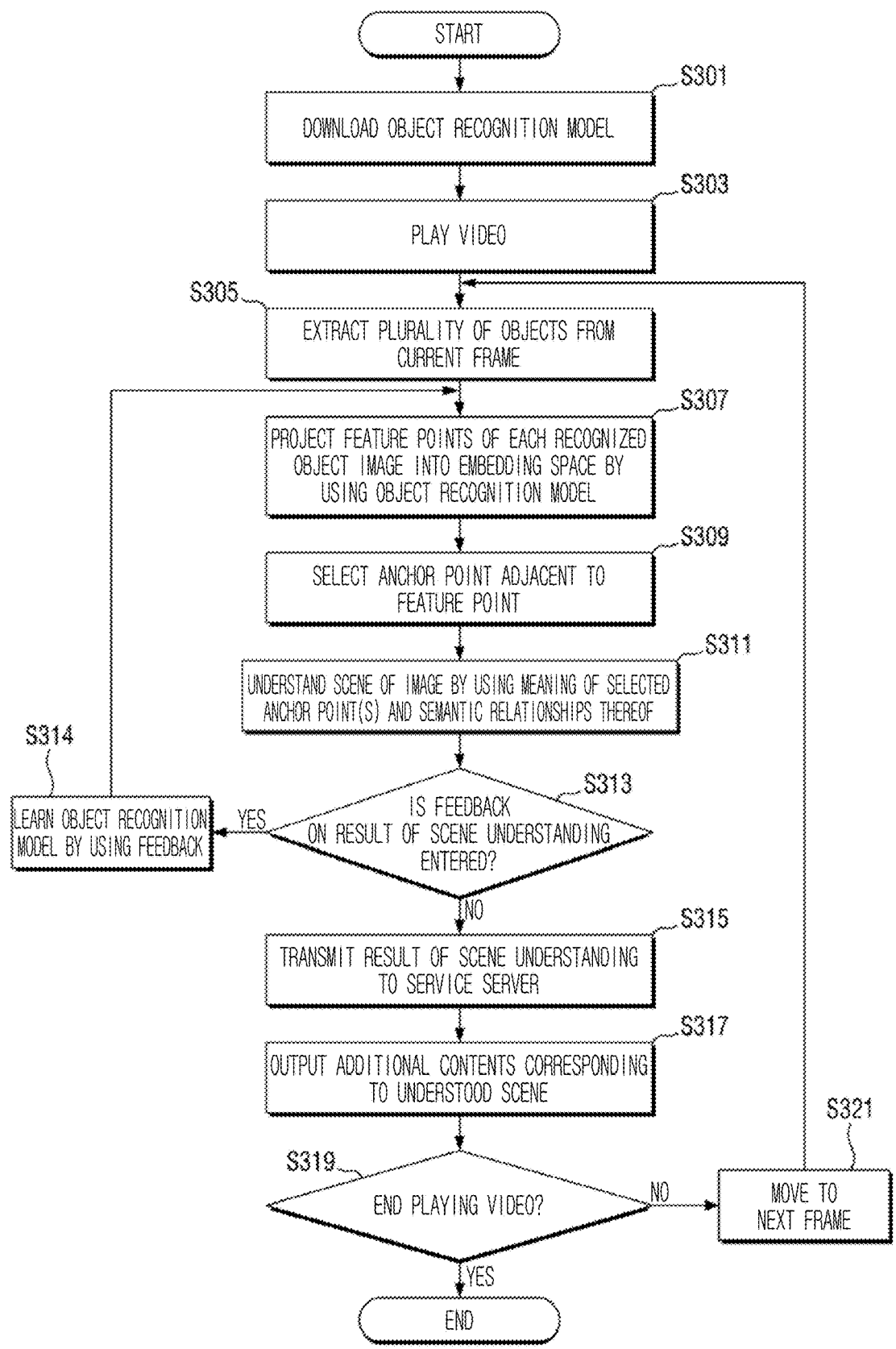
FIG. 19 is a flowchart illustrating a scene understanding method according to another embodiment of the disclosure.

FIG. 19 is a flowchart illustrating a scene understanding method according to another embodiment of the disclosure. The method according to the embodiment may be performed, for example, by the electronic apparatus 100 illustrated in FIG. 15. Note that the operation of the electronic apparatus described with reference to FIGS. 15 and 16 may be included in the scene understanding method. Accordingly, although there is no separate disclosure in the description of the scene understanding method described below, the operations described above with reference to FIGS. 15 and 16 may be included in the scene understanding method. In addition, in the following description of the method, when there is no description of a subject of the operation, the subject may be interpreted as the electronic apparatus.

In an operation S301, the object recognition model is downloaded from a server device or the like and stored. When an image is displayed for reasons such as playback of a video S303, a plurality of objects are extracted from the currently displayed image S305. At this time, an object recognition model to be used may be selected from the downloaded object recognition models.

In an operation S307, for each object image, the feature point may be mapped to the embedding space according to the object recognition model by using the selected object recognition model. In an operation S309, an anchor point adjacent to at least a portion of the mapped feature points may be selected, and in an operation S311, the scene of the currently displayed image may be understood using the semantic relationship and a meaning of the selected anchor point.

Meanwhile, a result of understanding the scene of the image is presented, and a user's feedback thereof may be input thereto S313. When the feedback is input, learning about the object recognition model may be performed using the input feedback S314. This may be understood as a form of incremental learning.

In an operation S315, the scene understanding result data is transmitted to the service server, and additional content corresponding to the scene may be output as a response S317.

As long as the video playback is not finished S319, the scene understanding method may be continuously performed while moving to the next frame S312.

The methods according to the embodiments described so far may be performed by executing a computer program embodied in computer readable code. The computer program may be transmitted from a first electronic apparatus to a second electronic apparatus through a network such as the Internet and installed in the second electronic apparatus, and thus may be used in the second electronic apparatus. The first electronic apparatus and the second electronic apparatus include a server device, a physical server belonging to a server pool for cloud service, a fixed electronic apparatus such as a desktop PC, or the like.

The computer program may be stored in a non-transitory recording medium such as a DVD-ROM, flash memory device, or the like.

While the present disclosure has been shown and described with reference to various embodiments thereof, it will be understood by those skilled in the art that the present application may be implemented in other specific forms without changing its technical spirit or essential features. Accordingly, it should be understood that the above-described embodiments are illustrative in all respects and not limited.

What is claimed is:

1. An electronic apparatus comprising:
a memory configured to store at least one instruction; and
a processor configured to execute the stored instruction to:
    extract feature data from a first class of training data
    obtain a feature point by mapping the extracted feature data to an embedding space, and
    train an artificial neural network in a direction for reducing a distance between the obtained feature point and an anchor point in the embedding space for the first class of training data, and
wherein the anchor point for the first class of training data comprises feature data extracted from representative data of the first class mapped to the embedding space and a position in the embedding space of the anchor point for the first class of training data is based on semantic relationship information between the first class and at least a second class, different from the first class, for a second class of training data.

2. The electronic apparatus as claimed in claim 1, wherein the processor is configured to train the artificial neural network using a loss function which defines that the closer the feature point of first class of training data to the anchor point for the first class of training data, the less the loss, and the closer the feature point of the second class of training data to the anchor point for the first class of training data, the greater the loss.

3. The electronic apparatus as claimed in claim 1, wherein the processor is configured to train a convolutional neural network (CNN) layer for extracting the feature data of the first class of training data, and a metric learning layer for obtaining a distance between the feature point obtained by receiving data output from the CNN layer and the anchor point for the first class of training data collectively.

4. The electronic apparatus as claimed in claim 3, wherein the processor is configured to separate from the CNN layer, only the metric learning layer for obtaining a distance between the feature point obtained by receiving data output from the CNN layer for extracting the feature data of the training data of the first class and the anchor point for the first class of training data and train the separated metric learning layer.

5. The electronic apparatus as claimed in claim 1, wherein the artificial neural network comprises a metric learning layer which outputs cluster feature data formed on the embedding space, and
    wherein the processor is configured to train an object classification layer including a single layer that receives data output from the metric learning layer and output a confidence level by each class.

6. The electronic apparatus as claimed in claim 1, wherein the processor is configured to train the artificial neural network in a direction that the feature point of the training data of the first class is closer to the anchor point of the first class of training data, and at the same time, a feature point of the training data of the second class is closer to the anchor point of the second class of training data, in the embedding space.

7. The electronic apparatus as claimed in claim 6, wherein the semantic relationship information comprises a distance in a semantic tree between a keyword of the first class of training data and a keyword of the second class of training data, and
wherein the semantic tree reflects semantic hierarchical relationships between each keyword, and the distance in the semantic tree between the keyword of the first class of training data and the keyword of the second class of training data increases as a number of nodes between a first node corresponding to the keyword of the first class of training data and a second node corresponding to the keyword of the second class of training data increases.

8. The electronic apparats as claimed in claim 6, wherein the processor is configured to update a position in the embedding space of at least one of a first class cluster and a second class cluster based on the semantic relationship information,
wherein the first class cluster comprises the feature point of the first class of training data and the anchor point of the first class of training data, and
wherein the second class cluster comprises the feature point of the second class of training data and the anchor point of the second class of training data.

9. The electronic apparatus as claimed in claim 1, wherein the processor is configured to update the position of the anchor point of the first class of training data in the embedding space by reflecting the feature point of the first class of training data, and train the artificial neural network in a direction to reduce the distance between the feature point of the first class of training data and the updated anchor point.

10. The electronic apparatus as claimed in claim 9, wherein the processor is configured to not perform position update of the anchor point of the first class of training data in an initial training comprising a first iteration of a first time from a training start point and perform, position update of the anchor point of the first class of training data in an iteration after the initial training.

11. The electronic apparatus as claimed in claim 10, wherein the performing position update of the anchor point of the first class of training data in the iteration after the initial training comprises performing position update of the anchor point of the first class of training data once every two or more iterations.

12. The electronic apparatus as claimed in claim 10, wherein the first time is set to a first value based on a type of the first class of training data being a first type, and is set to a second value based on the type of the first class of training data being a second type.

13. An electronic apparatus comprising:
a memory configured to store at least one instruction; and
a processor configured to execute the stored instruction;
obtain feature points in an embedding space of each of a plurality of objects extracted from an image using an object recognition model which outputs data related to feature points on the embedding space, and
recognize a scene of the image by using a keyword of an anchor point, among a plurality of anchor points, closest to at least some of the feature points,
wherein each anchor point comprises a representative image for a respective class of training data mapped onto the embedding space, and
wherein the embedding space comprises a feature space in which a distance between anchor points is determined based on semantic relationship between the anchor points.

14. The electronic apparatus as claimed in claim 13, wherein the processor is configured to select a lower level anchor point closest to each of the mapped feature points,
select at least some upper node from among nodes of a semantic tree corresponding to each of the selected lower level anchor points, and
recognize the scene of the image by using a keyword corresponding to the selected upper node.

15. The electronic apparatus as claimed in claim 13, wherein the processor is configured to select an upper level anchor point closest to at least some of the mapped feature points, and
recognize the scene of the image by using a keyword corresponding to the selected the upper level anchor point.

16. The electronic apparatus as claimed in claim 13, wherein the processor is configured to select the object recognition model based on a type of the image.

17. The electronic apparatus as claimed in claim 13, wherein the processor is configured to select the object recognition model based on user profile information.

18. The electronic apparatus as claimed in claim 13, wherein the processor is configured to select the object recognition model based on an application service type.

19. The electronic apparatus as claimed in claim 13, wherein the processor is configured to output additional contents corresponding to the recognized scene.

20. A method performed by an electronic apparatus, the method comprising:
obtaining feature points in an embedding space of each of a plurality of objects extracted from an image by using an object recognition model that outputs data related to feature points on an embedding space; and
recognizing a scene of the image using a keyword of an anchor point, among a plurality of anchor points, closest to at least some of the feature points from among the feature points,
wherein each anchor point comprises a representative image for a respective class of training data mapped on the embedding space, and
wherein the embedding space comprises a feature space in which a distance between the anchor points is determined based on semantic relationship between the anchor points.

* * * * *